(12) United States Patent
Arai et al.

(10) Patent No.: US 6,411,587 B1
(45) Date of Patent: Jun. 25, 2002

(54) OPTICAL PICKUP OPTICAL SYSTEM, OPTICAL PICKUP APPARATUS, COUPLING OPTICAL SYSTEM, COUPLING OPTICAL SYSTEM LENS AND RECORDING/ REPRODUCTION APPARATUS

(75) Inventors: Norikazu Arai; Toshiyuki Kojima; Koji Honda, all of Hachioji (JP)

(73) Assignee: Konica Corporation, Tokyo (JP)

( * ) Notice: Subject to any disclaimer, the term of this patent is extended or adjusted under 35 U.S.C. 154(b) by 6 days.

(21) Appl. No.: 09/685,012

(22) Filed: Oct. 5, 2000

(30) Foreign Application Priority Data

Oct. 8, 1999 (JP) .............................. 11-287765
Feb. 23, 2000 (JP) ....................... 2000-046255

(51) Int. Cl.[7] ................................. G11B 7/00
(52) U.S. Cl. ............... 369/112.01; 369/44.23; 369/44.12; 369/112.2
(58) Field of Search ........................... 369/44.11, 44.12, 369/44.14, 44.23, 44.25, 44.32, 44.37, 112.01, 112.03, 112.06, 112.07, 112.08, 112.2, 112.23, 112.26

(56) References Cited

U.S. PATENT DOCUMENTS

| | | | |
|---|---|---|---|
| 5,446,565 A | * | 8/1995 | Komma et al. ............... 369/94 |
| 5,665,957 A | * | 9/1997 | Lee et al. .................. 369/44.24 |
| 6,124,988 A | * | 9/2000 | Yanagisawa et al. ..... 369/44.23 |

FOREIGN PATENT DOCUMENTS

| | | |
|---|---|---|
| JP | 61-003110 | 1/1986 |
| JP | 62-269922 | 11/1987 |
| JP | 62-286009 | 12/1987 |
| JP | 09-311271 | 12/1997 |
| JP | 11-174318 | 7/1999 |

* cited by examiner

Primary Examiner—Muhammad Edun
(74) Attorney, Agent, or Firm—Finnegan, Henderson, Farabow, Garrett & Dunner, L.L.P.

(57) ABSTRACT

An optical pickup apparatus for recording and/or reproducing information on an optical information recording medium includes a light source emitting a light flux, a light-converging optical system to converge a light flux emitted from the light source, having a coupling optical system which changes a divergent angle of a light flux emitted from the light source and an objective lens optical system which converges a light flux emerging from the coupling optical system on an information recording surface of the optical information recording medium, and an optical detector for detecting reflected light or transmitted light coming from the information recording surface of the optical information recording medium. In the optical pickup apparatus, at least one surface of the coupling optical system is provided with a diffraction surface by which the longitudinal spherical aberration on the occasion wherein light having a wavelength differing from that of light with a prescribed wavelength by a prescribed difference of wavelength is made to enter the objective lens optical system through the coupling optical system is made to be smaller, compared with the longitudinal spherical aberration on the occasion wherein light having a wavelength different by a prescribed difference of wavelength is made to enter the objective lens optical system.

20 Claims, 21 Drawing Sheets

LONGITUDINAL
SPHERICAL ABER

ASTIGMATIC
FIELD CURVES

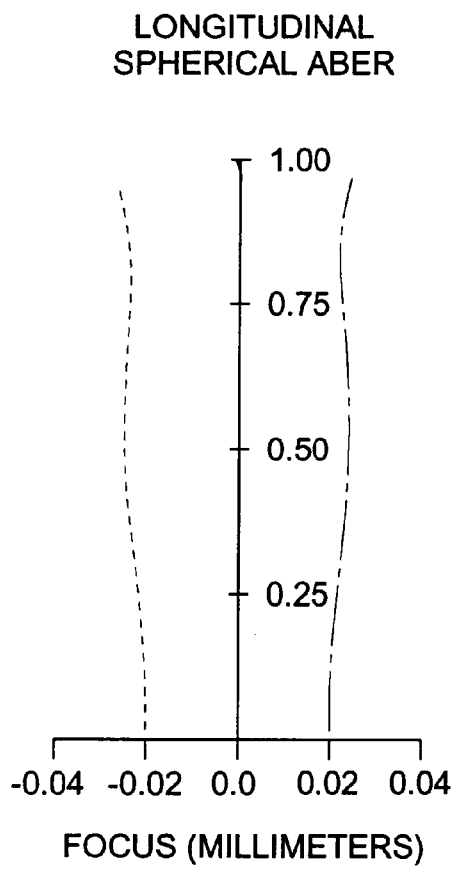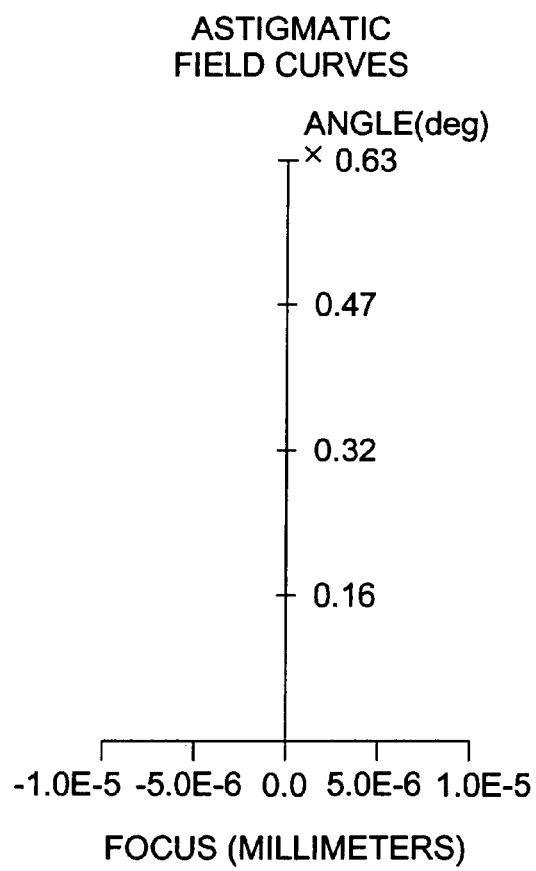

- - - - - - 410.0 NM
——————— 400.0 NM
— - — - — 390.0 NM

LONGITUDINAL SPHERICAL ABER

ASTIGMATIC FIELD CURVES

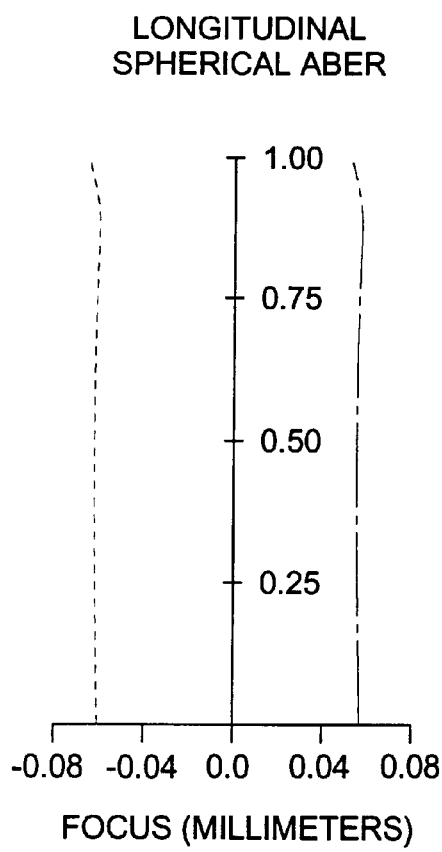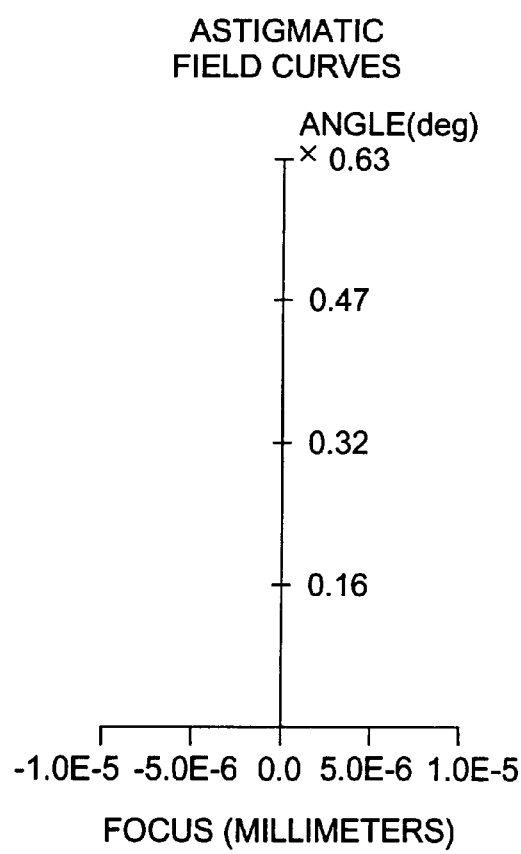

----- 410.0 NM
———— 400.0 NM
—·—·— 390.0 NM

LONGITUDINAL
SPHERICAL ABER

ASTIGMATIC
FIELD CURVES

OPTICAL PICKUP OPTICAL SYSTEM, OPTICAL PICKUP APPARATUS, COUPLING OPTICAL SYSTEM, COUPLING OPTICAL SYSTEM LENS AND RECORDING/ REPRODUCTION APPARATUS

BACKGROUND OF THE INVENTION

The present invention relates to an optical system for optical pickup, an optical pickup apparatus, a coupling optical system, a coupling optical system lens and a recording/reproduction apparatus, and in particular, to an optical system for optical pickup, an optical pickup apparatus, a coupling optical system, a coupling optical system lens and a recording/reproduction apparatus which are used suitably for a high density optical disk apparatus employing a light source wherein monochromaticity is poor, or a wavelength fluctuates quickly.

In recent years, there has been developed, as an optical information recording medium, a DVD (storage capacity: 4.7 GB) which is similar in terms of size to a CD (storage capacity: 640 MB) and is enhanced in terms of recording density, and it has spread rapidly. For reproduction of the DVD, there is used a laser beam emitted from a light source wherein a wavelength is 635 nm–660 nm. A divergent light flux emitted from the laser light source is collimated to a collimated light flux by a collimator lens, and then, enters an objective lens whose numerical aperture (NA) on the part of DVD is 0.6 to be converged on an image recording surface through a transparent base board of DVD.

Recently, optical information recording media similar to CD and DVD having storage capacity of 10–30 GB are developed actively, by the use of an objective lens with further higher NA and a light source with further shorter wavelength. As a short wavelength light source which is considered to be hopeful, there is a GaN blue semiconductor laser having an oscillation wavelength of about 400 nm.

However, the oscillation wavelength of the GaN blue semiconductor laser is temperature-dependent in the same way as in other semiconductor lasers, and in addition, fluctuation of the wavelength is caused by the mode hop or by laser output, and high frequency superimposing is necessary for reducing laser noise, resulting in poor monochromaticity of the oscillation wavelength, which are specific characters. It is therefore predicted that correction of longitudinal chromatic aberration (longitudinal spherical aberration) is necessary in the light-converging optical system of high density optical disk employing the GaN blue semiconductor laser.

In Session WD 26 of ISOM/ODS' 99 (Joint International Symposium on Optical Memory and Optical Data Storage 1999) Postdeadline Poster Papers, there was shown an example of experiments wherein, when a high density optical disk with storage capacity of 17 GB was reproduced by an ordinary objective lens whose numerical aperture on the part of a disk is 0.6, multi-mode oscillation is caused by high frequency superimposing to make the spectral band width to be 0.7 nm (FWHM), and jitters were worsened, compared with an occasion where no high frequency superimposing was carried out, and there was proposed an objective lens of a junction doublet type wherein longitudinal chromatic aberration is improved, and the surface on the part of a light source and the surface on the part of a disk are aspherical, and the junction surface is spherical.

As an objective lens of a junction doublet type for an optical disk wherein chromatic aberration is corrected, those described in Japanese TOKKAISHO Nos. 61-3110 and 62-286009 are known. Further, Japanese TOKKAIHEI No. 9-311271 discloses an objective lens wherein both surfaces are aspherical and represent a phase type diffraction element, and a numerical aperture on the part of an optical information recording medium is 0.7 or more.

There are further proposed an optical disk device employing an objective lens of a two-element structure whose numerical aperture on the part of an optical information recording medium is 0.85, and a high density disk. For example, in Session WC 1 (on page 50 of the preliminary report) of ISOM/ODS' 99, there was announced an optical disk device having storage capacity of 9.2 GB wherein a red semiconductor laser with wavelength of 65.0 nm was used. Further, in Session WD 1 (on page 28 of the preliminary report 2) of ISOM/ODS' 99, it was announced that the storage capacity of 20 GB was attained by using a GaN semiconductor laser with wavelength of 400 nm. With regard to these semiconductor lasers, there was no announcement about an influence of wavelength fluctuation.

In Japanese TOKKAIHEI No. 11-174318, there is described an objective lens of a two-element structure wherein the numerical aperture on the part of an optical information recording medium is 0.85 and a hologram is provided on the optical surface for correcting chromatic aberration. As stated above, it is possible to correct chromatic aberration by introducing a diffraction element in the objective lens optical system, but, manufacturing cost of a diffraction lens made of glass is very high in general.

On the other hand, as an objective lens made of plastic wherein chromatic aberration is corrected by a diffraction element, those wherein the numerical aperture on the part of an optical information recording medium is about 0.55 are put to practical use. However, with regard to an objective lens made of plastic, its spherical aberration fluctuates when a refractive index of the objective lens is varied by temperature change. Therefore, the objective lens made of plastic is not suited for a converging optical system of a high density optical disk wherein a short wavelength is required for a light source and a high NA is required for the objective lens. Though spherical aberration fluctuation caused by temperature change can be lightened by the two-element structure even in the case of an objective lens made of plastic, change in an outside diameter caused by temperature change is great because the coefficient of expansion of plastic material is greater than that of glass, and thereby, the lens tends to be distorted by temperature change to low temperature or to high temperature after being incorporated in the lens frame, which is a problem. Therefore, when the spherical aberration fluctuation caused by temperature change also is considered, it is preferable that at least one of two lenses is made to be a glass lens.

Being affected by heat generation from an actuator for driving an objective lens, temperature distribution is caused on the objective lens, and this causes distribution of refractive index when the objective lens is a plastic lens, thus, wavefront aberration of a light flux that has passed through the objective lens is worsened to cause problems easily. Accordingly, even in the case of an objective lens of a two-element structure, it is preferable that both of the two elements are represented by a glass lens when temperature characteristics are taken in consideration. However, the glass lens has a problem of manufacturing cost as stated above, and it is actually difficult to collect chromatic aberration by only an objective lens for high density disk.

As represented by an objective lens of a junction doublet type for optical disk, a lens wherein a lens made of low dispersion material having positive refracting power and a lens wherein a lens made of high dispersion material having negative refracting power are combined without using a diffraction element, is not suited for an objective lens for optical disk which is definitely required to be light in weight. The reason for the foregoing is that the refracting power of each lens is required to be great to attain high NA of the lens because dispersion of a material is limited, thereby, weight of the lens itself tends to be increased.

Japanese TOKKAISHO No. 62-269922 discloses a method to correct longitudinal spherical aberration of the total light-converging optical system for recording/reproducing an optical information recording medium, by correcting chromatic aberration of an objective lens insufficiently and by correcting chromatic aberration of a collimator lens excessively.

In view of the circumstances mentioned above, an object of the invention is to provide an optical pickup optical system which can be manufactured at low cost and can be corrected in terms of longitudinal spherical aberration by a relatively simple structure even when using a light source with poor monochromaticity or a light source wherein a wavelength varies quickly, in high density optical disk device, for example, an optical pickup device equipped with the aforesaid optical system for optical pickup and a recording/reproducing apparatus equipped with the optical pickup device.

Further object of the invention is to provide a coupling optical system which can correct longitudinal spherical aberration when it is used, for the purposes of correction of spherical aberration, correction of sine conditions, making to be small, making to be thin, making to be light and making to be low cost, together with an objective lens wherein longitudinal spherical aberration remains, because of a large numerical aperture on the part of an optical information recording medium, and to provide a lens for the coupling optical system. Another object of the invention is to provide a coupling lens for an optical pickup device and an optical pickup device which are capable of recording/reproducing information properly, even when a laser light source unit such as one to house two lasers, for example, in one package is used.

First, there will be considered the reasons why standards for longitudinal spherical aberration are strict in high density disk, and why longitudinal and remaining chromatic aberration in the vicinity of wavelength of a light source in an objective lens optical system used for a light-converging optical system for recording/reproducing an existing optical information recording medium, matters.

In the following explanation, let it be assumed that $\lambda$ represents a wavelength of a light source and NA represents a numerical aperture of an objective lens optical system on the part of an optical information recording medium. To make the explanation simple, let is be assumed that a light-converging optical system is composed of a light source, a collimator, an objective lens optical system and a transparent base board of an optical information recording medium, and the collimator is an ideal lens (all aberrations are corrected). Namely, even when the wavelength of the light source fluctuates, an incident light flux into the objective lens optical system is a collimated light flux that is in parallel with an optical axis.

Further, with regard to the objective lens optical system, its spherical aberration is corrected completely for standard wavelength $\lambda 0$, and root mean square value Wrms of wavefront aberration is 0 under the condition of focus. Let is be assumed that spherical aberration is not changed by an objective lens optical system for wavelength fluctuation $\Delta\lambda$, but back focus fB is changed by $\Delta$fB. When the objective lens optical system is driven by fB in the direction of an optical axis for focusing, for back focus variation, Wrms is 0, but when no focusing is conducted, Wrms is expressed by following Expression (1).

$$\mathrm{Wrms}=0.145\cdot\{(NA)^2/\lambda\}/|\Delta fB| \quad (1)$$

From Expression (1), when DVD (NA=0.6, $\lambda$=650 nm) is compared with advanced optical disk having NA 0.85 and $\lambda$=400 nm as an example, deterioration of wavefront aberration for the latter is 3.26 times that of the former even when $\Delta$fB is the same for both cases. Namely, if the tolerance of the wavefront aberration is the same, the tolerance of $|\Delta fB|$ is made to be as small as 1/3.26, which makes it necessary to lessen the remaining longitudinal spherical aberration.

In the case of a single thin lens, when assuming that a focal length is represented by f and a refractive index is represented by $n(\lambda)$ as a function of wavelength $\lambda$, the following expression (2) holds.

$$df/d\lambda=[-f/\{n(\lambda)-1\}]\cdot dn/d\lambda \quad (2)$$

When $n(\lambda+\alpha 1)$ and $n(\lambda-\alpha 2)$ are introduced to replace a differential with a finite difference, the expression (2) can be rewritten as the following expression (3). In this case, $\alpha 1$ and $\alpha 2$ are assumed to represent an amount of deviation from the standard wavelength.

$$\Delta f=[-f/\{n(\lambda)-1\}]\cdot\{n(\lambda+\alpha 1)-n(\lambda-\alpha 2)\}=f/\nu(\lambda,\alpha 1,\alpha 2) \quad (3)$$

In the expression above, however, the following expression holds;

$$\nu(\lambda,\alpha 1,\alpha 2)=\{n(\lambda)-1\}/\{n(\lambda-\alpha 2)-n(\lambda+\alpha 1)\}$$

wherein, $\nu(\lambda,\alpha 1,\alpha 2)$ represents dispersion under the condition of wavelength $\lambda$.

In the case of a photographic lens that deals with natural light, there are used $\lambda=\lambda D$, $\lambda-\alpha 2=\lambda F$ and $\lambda+\alpha 1=\lambda C$ ($\lambda D$, $\lambda F$ and $\lambda C$ are refractive indexes for spectral lines respectively of d line (589.6 nm), f line (486.1 nm) and c line (656.3 nm)). In the light-converging optical system for recording/reproducing an optical information recording medium, fluctuation in wavelength of a light source and longitudinal spherical aberration in a range of the fluctuation are important. In the present specification, therefore, it is assumed that $\alpha 1=\alpha=10$ nm and a unit of $\lambda$ is represented by nm, and $\nu(\lambda)$ is defined again to be like the following expression (4).

$$\nu(\lambda)=\{n(\lambda)-1\}/\{n(\lambda-10)-n(\lambda+10)\} \quad (4)$$

Because of fB=f in the thin lens, the expression (3) turns into the following expression;

$$\Delta fB=f/\nu(\lambda) \quad (5)$$

wherein $\Delta$fB shows a rough value of a change in back focus corresponding to a wavelength variation of 20 nm in the vicinity of the wavelength.

(Table 1) shows refractive indexes at 780 nm±10 nm, 650 nm±10 nm and 400 nm±10 nm for main lens materials. The wavelength of 780 nm is one used for CD, 650 nm is one used for DVD and 400 nm is one that is expected to be used for an optical disk of advanced as mentioned earlier.

TABLE 1

|     | M-NbFD82 | F2     | M-BaCD12 | BK7    | FCD1   | Olefine Type resin |
|-----|----------|--------|----------|--------|--------|--------------------|
| 790 | 1.8000   | 1.6087 | 1.5762   | 1.5110 | 1.4927 | 1.5021             |
| 780 | 1.8005   | 1.6091 | 1.5764   | 1.5112 | 1.4928 | 1.5023             |
| 770 | 1.8010   | 1.6095 | 1.5767   | 1.5114 | 1.4930 | 1.5025             |
| 660 | 1.8079   | 1.6148 | 1.5800   | 1.5142 | 1.4951 | 1.5053             |
| 650 | 1.8087   | 1.6154 | 1.5804   | 1.5145 | 1.4953 | 1.5056             |
| 640 | 1.8096   | 1.6161 | 1.5808   | 1.5148 | 1.4955 | 1.5060             |
| 410 | 1.8521   | 1.6491 | 1.5988   | 1.5286 | 1.5067 | 1.5229             |
| 400 | 1.8561   | 1.6523 | 1.6004   | 1.5298 | 1.5077 | 1.5244             |
| 390 | 1.8606   | 1.6558 | 1.6021   | 1.5311 | 1.5087 | 1.5261             |

Table 2 shows results of calculations of $v(780)$, $v(650)$ and $v(400)$ conducted from Table 1 and based on the expression (4).

TABLE 2

| $v(780)$ | 800 | 781 | 1153 | 1162 | 1590 | 1288 |
| $v(650)$ | 476 | 488 | 764  | 843  | 1032 | 755  |
| $v(400)$ | 101 | 98  | 182  | 205  | 254  | 165  |

As is apparent from Table 2, the shorter the wavelength is, the smaller is $v(\lambda)$, and from the expression (5), the shorter the wavelength is, the greater is $\Delta fB$. In this case, $v(400)$ is as small as ¼ to ⅕ of $v(650)$ as shown in Table 3.

TABLE 3

| $v(650)/v(780)$ | 0.59 | 0.63 | 0.66 | 0.73 | 0.65 | 0.59 |
| $v(400)/v(780)$ | 0.13 | 0.13 | 0.16 | 0.18 | 0.16 | 0.13 |
| $v(400)/v(650)$ | 0.21 | 0.20 | 0.24 | 0.24 | 0.25 | 0.22 |

Accordingly, when an objective lens is represented by a refraction lens whose longitudinal spherical aberration is determined by $v(\lambda)$ of a lens material, fluctuation of back focus caused by wavelength variation is too big to reduce the longitudinal spherical aberration sufficiently, in application of an advanced optical disk where a blue semiconductor laser having a wavelength of about 400 nm is used.

Incidentally, a diffraction element can control a light flux by means of diffraction, and thereby, has a lens effect which is the same as that of a refraction lens. The relationship between focal length f of the diffraction element and wavelength of a light source can be expressed by the following expression (6) when of represents a focal length in the case of designed wavelength $\lambda 0$.

$$f = (\lambda 0/\lambda) \text{of} \tag{6}$$

When the expression (6) is changed in a form like a refraction lens, there holds the following expression which further turns into the expression that follows the following expression.

$$df/d\lambda = -(\lambda 0/\lambda^2)\text{of} = -f/\lambda \tag{7}$$

$$\Delta f = -(f/\lambda)\Delta\lambda \tag{8}$$

$$= -f\{(\lambda + \alpha 1) - (\lambda - \alpha 2)\}/\lambda$$

$$= f\{(\lambda - \alpha 2) - (\lambda + \alpha 1)\}/\lambda$$

When the following expression holds in the same way as in the refraction lens;

$$\Delta f = f/v(\lambda, \alpha 1, \alpha 2) \tag{9}$$

the following expression holds.

$$v(\lambda, \alpha 1, \alpha 2)) = \lambda/\{(\lambda - \alpha 2) - (\lambda + \alpha 1)\} \tag{10}$$

Now, it is assumed that $\alpha 1 = \alpha 2 = 10$ nm and a unit of $\lambda$ is represented by nm, and $v(\lambda)$ is defined again to be like the following expression (11).

$$v(\lambda) = /\{(\lambda - 10) - (\lambda + 10)\} \tag{11}$$

Therefore, the results of calculation of $v(780)$, $v(650)$ and $v(400)$ concerning a diffraction element based on the expression (11) are as follows.

$v(780) = -39.0$
$v(650) = -32.5$
$v(400) = -20.0$

It is possible to correct longitudinal spherical aberration, while controlling the refractive power of each element to be small by combining the diffraction element having negative $v(\lambda)$ with a diffraction element having positive $v(\lambda)$, because $v(\lambda)$ of the diffraction element is negative as shown above, However, when $v(400)$ is compared with $v(650)$ concerning a diffraction element, a change of the absolute value is small when it is compared with a refraction lens, although the absolute value itself becomes small. Therefore, in the blue semiconductor laser area, correction of chromatic aberration is considered to be difficult even when a diffraction element is combined with a refraction element.

Next, there will be examined a light-converging optical system composed of an objective lens optical system composed of an infinite conjugate type refraction single lens whose longitudinal spherical aberration is determined by $v(\lambda)$ and of a collimator optical system composed of a hybrid element wherein a diffraction element is combined with a refraction element, or of a coupling optical system.

An infinite conjugate type objective lens is a lens that is corrected so that its spherical aberration through a transparent base board of an optical information recording medium for a collimated light flux that is in parallel with an optical axis may be mostly minimum. Namely, magnification m0 of the objective lens is zero. Therefore, the coupling optical system turns into a collimator optical system which changes a light flux emitted from a light source into a collimated light flux which is in parallel with an optical axis and is corrected in terms of spherical aberration.

Concerning the light-converging optical system like one stated above, when longitudinal spherical aberration of an objective lens is represented by $\Delta fBO$, and longitudinal spherical aberration of a collimator optical system is represented by $\Delta fBC$, longitudinal spherical aberration $\Delta fBC$ of the total light-converging optical system is expressed by the following expression, when mT represents the magnification of the total light-converging optical system.

$$\Delta fBT = \Delta fBO + (mT)^2 \cdot \Delta fBC \tag{12}$$

In the occasion where longitudinal spherical aberration of the total light-converging optical system is corrected, $\Delta fBT$ is zero. Therefore, in this case, the expression (12) is changed in terms of a form, and the following expression holds.

$$\Delta fBC = -(1/mT^2) \cdot \Delta fBO \tag{13}$$

In this case, the objective lens and the collimator optical system are analyzed as a thin lens. Since the back focus is equal to the focal length in the thin lens, the following expressions hold.

$$\Delta fBO = \Delta of \qquad (14)$$

$$\Delta fBC = \Delta fC \qquad (15)$$

Therefore, the expression (13) can be substituted with the following expression.

$$\Delta fC = -(1/mT^2)\cdot \Delta of \qquad (16)$$

Even for the collimator optical system, calculation will be advanced under the condition of approximation to a thin type wherein a diffraction element and a refraction element are arranged to be close to each other. When a focal length of the diffraction element is represented by fCR, a focal length of the refraction element is represented by fCD and a focal length of the total collimator optical system is represented by fC, the following expression holds.

$$1/fC = 1/fCR + 1/fCD \qquad (17)$$

When both sides of the above expression are differentiated, the following expression holds.

$$-\Delta fC/fC^2 = -\Delta fCR/fCR^2 - \Delta fCD/fCD^2 \qquad (18)$$

Therefore, when the expression (5) is considered, the following expression holds.

$$\Delta fC = (\Delta fCR/fCR^2 + \Delta fCD/fCD^2)\cdot fC^2 = \{1/(vR\cdot fCR) + 1/(vD\cdot fCD)\}\cdot fC^2 \qquad (19)$$

In the expression above, vR represents dispersion of a material of the refraction element, namely, it is $v(\lambda)$, while, vD represents dispersion of the diffraction element.

Therefore, the conditional expression under which the longitudinal spherical aberration should be corrected is as follows, from the expressions (16) and (19).

$$\{1/(vR\cdot fCR) + 1/(vD\cdot fCD)\}\cdot fC^2 = -(1/mT^2)\cdot \Delta fO \qquad (20)$$

In the aforesaid expression, fC and mT are based on specifications of the light-converging optical system. $\Delta fO$ is a remaining longitudinal spherical aberration of the objective lens, and when the objective lens is a refraction single lens, $\Delta fO$ is determined by a focal length of the refraction single lens and by dispersion $v(\lambda)$ of a lens material. Further, vD is a constant determined in accordance with a wavelength, and vR is an amount that is determined if a material of the lens element constituting the collimator optical system is selected.

Therefore, for obtaining unknowns fCR and fCD, simultaneous equations need to be solved. Though a process of calculation is omitted here, fCR and fCD can be expressed as follows.

$$fCR = (vR-vD)\cdot fC/[vR\{1+vD\cdot \Delta fO/(mT^2\cdot fC)\}] \qquad (21)$$

$$fCD = (vD-vR)\cdot fC/[vD\{1+vR\cdot \Delta fO/(mT^2\cdot fC)\}] \qquad (22)$$

Now, typical two examples will be examined by utilizing the expressions (21) and (22) stated above. First, there will be taken the example where longitudinal spherical aberration of the objective lens optical system is already corrected. Because of $\Delta fO=0$ at this time, the expressions (21) and (22) are as follows.

$$fCR = \{(vR-vD)/vR\}\cdot fC \qquad (23)$$

$$fCD = \{(vD-vR)/vD\}\cdot fC \qquad (24)$$

The expressions (23) and (24) respectively show fCR and fCD for an individual collimator optical system composed of a hybrid element wherein a diffraction element and a refraction element are combined, on which longitudinal spherical aberration is corrected.

Now, let power (refracting power) representing an inverse number of a focal length be introduced. When assuming that $\phi C$ represents power of the total collimator optical system, $\phi CR$ represents power of the refraction element constituting the collimator optical system and $\phi CD$ represents power of the diffraction element constituting the collimator optical system, there hold the following expressions.

$$\phi C = 1/fC \qquad (25)$$

$$\phi CR = 1/fCR \qquad (26)$$

$$\phi CD = 1/fCD \qquad (27)$$

$$\phi C = \phi CR + \phi CD \qquad (28)$$

From the expressions (23), (25) and (26), the following expression holds;

$$\phi CR = \{vR/(vR-vD)\}\cdot \phi C \qquad (29)$$

and from the expressions (24), (25) and (27), the following expression holds.

$$\phi CD = \{vD/(vD-vR)\}\cdot \phi C \qquad (30)$$

Further, following expressions hold when the expressions (29) and (30) are deformed.

$$\phi CR/\phi C = vR/(vR-vD) \qquad (31)$$

$$\phi CD/\phi C = vD/(vD-vR) \qquad (32)$$

Further, when a wavelength of a light source is 400 nm, $vD=-20$ is induced from the expression (11), and $vR=165$ is induced from Table 2 when olefine resin is used as a lens material. Therefore, when these numerical values are substituted in the expressions (31) and (32), following expressions hold.

$$\phi CR/\phi C = 0.892 \qquad (33)$$

$$\phi CD/\phi C = 0.108 \qquad (34)$$

Next, there will be considered an occasion wherein remaining longitudinal spherical aberration for an objective lens $\Delta fO$ is not zero. In the case of an objective lens which is a refraction single lens, when the objective lens is assumed to be a thin lens, the following expression holds in the same way as in the expression (3).

$$\Delta fO\alpha = fO/vO(\lambda) \qquad (35)$$

Further, in the case where longitudinal spherical aberration of an objective lens optical system representing a refraction single lens made of a material with dispersion $vO(\lambda)$ is not corrected, when the objective lens is assumed to be a thin lens, following expression (36) holds.

$$fC = -fO/mT \qquad (36)$$

Therefore, the following expression holds.

$$\Delta fO/(mT^2\cdot fC) = -(1/mT)\cdot (\Delta fO/fO) \qquad (37)$$
$$= -1/\{mT\cdot vO(\lambda)\}$$

When the expression (37) is substituted in the expressions (21) and (22), following expressions hold.

$$fCR = (vR - vD) \cdot fC/[vR\{1 - vD/(mT \cdot vO(\lambda))\}] \quad (38)$$

$$fCD = (vD - vR) \cdot fC/[vD\{1 - vR/(mT \cdot vO(\lambda))\}] \quad (39)$$

When calculation is conducted by the use of the expressions (25)–(27), for the expressions (38) and (39), following expressions hold.

$$\phi CR/\phi C = vR \cdot \{1 - vD/(mT \cdot vO(\lambda))\}/(vR - vD) \quad (40)$$

$$\phi CD/\phi C = vD \cdot \{1 - vR/(mT \cdot vO(\lambda))\}/(vD - vR) \quad (41)$$

The expressions (40) and (41) show that $\phi CR/\phi C$ and $\phi CD/\phi C$ are determined not by a focal length of the objective lens optical system but by $vR$, $vD$, $vO(\lambda)$ and $mT$, when correcting longitudinal spherical aberration for the total light-converging optical system combined with an objective lens optical system wherein a collimator optical system composed of a hybrid element wherein a diffraction element and a refraction element are combined.

For example, when a wavelength of a light source is made to be 400 nm in the same way, the expression $vD = -20$ holds, and when olefine resin is used as a material of the collimator optical system, the expression of $vR = 165$ holds from Table 2. In this case, with regard to $vO(400) = 254$, namely, FCD1 representing a low refractive index and low dispersion material described in Table 2 and $vO(400) = 101$, namely, M-NbFD82 representing a low refractive index and low dispersion material described in Table 2, the relationship between mT and $\phi CR/\phi C$ and relationship between mT and $\phi CD/\phi C$ were calculated based on the expressions (40) and (41).

In the light-converging optical system for recording/reproducing an optical information recording medium, mT ranging from $-\frac{1}{2}$ to $-\frac{1}{8}$ is usually used (for reproducing only, mT ranging from $-\frac{1}{5}$ to $-\frac{1}{8}$ is usually used, but for both reproducing and recording, mT ranging from $-\frac{1}{2}$ to $-\frac{1}{5}$ is used because it is necessary to take in, efficiently as much as possible, a divergent light flux emitted from a light source) So, there were calculated $\phi CR/\phi C$ and $\phi CD/\phi C$ for the occasion where mT takes $-\frac{1}{2}$ (−0.500), $-\frac{1}{3}$ (−0.333), $-\frac{1}{4}$ (−0.250), $-\frac{1}{5}$ (−0.200), $-\frac{1}{6}$ (−0.167), $-\frac{1}{7}$ (−0.143), $-\frac{1}{8}$ (−0.125) and $-\frac{1}{20}$ (−0.050). Results of them are shown in Table 4 and Table 5.

TABLE 4

| | vO = 254 | | vR165 | | vD − 20 | | |
|---|---|---|---|---|---|---|---|
| m | −0.500 | −0.333 | −0.250 | −0.200 | −0.167 | −0.143 | −0.125 | −0.050 |
| $\phi CR/\phi C$ | 0.751 | 0.681 | 0.611 | 0.541 | 0.471 | 0.400 | 0.330 | −0.513 |
| $\phi CD/\phi C$ | 0.249 | 0.319 | 0.389 | 0.459 | 0.529 | 0.600 | 0.670 | 1.513 |
| NACR | 0.319 | 0.193 | 0.130 | 0.092 | 0.067 | 0.049 | 0.035 | −0.022 |
| NACD | 0.106 | 0.090 | 0.083 | 0.078 | 0.075 | 0.073 | 0.071 | 0.064 |
| λ/NACD | 3.79 | 4.43 | 4.84 | 5.12 | 5.33 | 5.49 | 5.62 | 6.22 |

TABLE 5

| | vO = 101 | | vR = 165 | | vD = −20 | | |
|---|---|---|---|---|---|---|---|
| m | −0.500 | −0.333 | −0.250 | −0.200 | −0.167 | −0.143 | −0.125 | −0.050 |
| $\phi CR/\phi C$ | 0.539 | 0.632 | 0.185 | 0.009 | −0.168 | −0.344 | −0.521 | −2.640 |
| $\phi CD/\phi C$ | 0.461 | 0.638 | 0.815 | 0.991 | 1.168 | 1.344 | 1.521 | 3.640 |
| NACR | 0.229 | 0.103 | 0.039 | 0.002 | −0.024 | −0.042 | −0.055 | −0.112 |
| NACD | 0.196 | 0.181 | 0.173 | 0.168 | 0.165 | 0.163 | 0.162 | 0.155 |
| λ/NACD | 2.04 | 2.21 | 2.31 | 2.37 | 2.42 | 2.45 | 2.48 | 2.59 |

As is apparent from Table 4 and Table 5, diffraction power becomes stronger as mT approaches 0. In the case of $vO = 254$, $\phi CR/\phi C$ is negative when mT is $-\frac{1}{20}$. On the other hand, in the case of $vO = 101$, $\phi CR/\phi C$ falls below zero when mT exceeds $-\frac{1}{5}$, and an absolute value of $\phi CR/\phi C$ becomes greater while taking the negative value as mT further approaches zero. Further, when mT is $-\frac{1}{20}$, an absolute value of each of $\phi CR/\phi C$ and $\phi CD/\phi C$ exceeds 1, and even in this case, it is possible to manufacture a diffraction optical element used for a coupling optical system, because a numerical aperture of a collimator optical system is small, as will be stated later.

The relationship between numerical aperture NAC of the collimator optical system on the part of a light source and numerical aperture NAO of the objective lens optical system on the part of an optical information recording medium is expressed by the following expression (42).

$$NAC=-mT \cdot NAO \quad (42)$$

When it is assumed that NACR represents a numerical aperture of a refraction lens and NACD represents a numerical aperture of a diffraction lens, the following expressions hold.

$$NACR=NAC \cdot \phi CR/\phi C \quad (43)$$

$$NACD=NAC \cdot \phi CD/\phi C \quad (44)$$

Values of NACR and NACD for NAO=0.85 were obtained based on the expressions (42) and (44) to be tabulated in Table 4 and Table 5.

Minimum pitch $\Lambda$min of a diffraction pattern by a diffraction optical element can approximate as shown by the following expression (45), when a wavelength is $\lambda$. Therefore, Table 4 and Table 5 show also the value of $\lambda$/NACD.

$$\Lambda min=\lambda/NACD \quad (45)$$

As is apparent from Table 4 and Table 5, NACR takes a value of 0.32 or less, NACD takes a value of 0.20 or less and $\Lambda$min takes a value of 2 $\mu$m or more, and these values are all manufacturable values. Since a light flux is not interfered actually even when an objective lens optical system is driven in the direction perpendicular to an optical axis of a collimator optical system for tracking, NAC, NACR and NACD are larger than the values shown in Table 4 and Table 5.

It is also possible to make a diffraction-refraction integrated optical element wherein one side or both sides of a refraction lens are made to be a diffraction optical element to be a coupling optical system, without constituting the coupling optical system with a refraction lens and a diffraction lens which are separate each other. As a diffraction-refraction integrated optical element, those having NA of about 0.55 wherein longitudinal spherical aberration of a light-converging optical system for recording/reproducing an optical information recording medium is corrected, are proposed as an objective lens. In the invention, for the reason that a numerical aperture of a refraction lens is small and curvature of the optical surface is not so large, and for the reason that a request for a coupling optical system to be thin and small for insurance of a working distance and light weight is not so strong unlike an objective lens, it is possible to manufacture a lens of a diffraction-refraction integrated optical element easily and at low cost as a part of the coupling optical system.

SUMMARY OF THE INVENTION

The object stated above can be attained by either one of the following Structures (1)–(20).

Structure (1): An optical pickup apparatus for recording and/or reproducing information on an optical information recording medium comprising a light source emitting a light flux, a light-converging optical system to converge a light flux emitted from the light source, having therein a coupling optical system which changes a divergent angle of a light flux emitted from the light source and an objective lens optical system which converges a light flux emerging from the coupling optical system on an information recording surface of the optical information recording medium, and an optical detector for detecting reflected light or transmitted light coming from the information recording surface of the optical information recording medium.

In the optical pickup apparatus stated above, at least one surface of the coupling optical system is provided with a diffraction surface by which the longitudinal spherical aberration on the occasion wherein light having a wavelength differing from that of light with a prescribed wavelength by a prescribed difference of wavelength is made to enter the objective lens optical system through the coupling optical system is made to be smaller, compared with the longitudinal spherical aberration on the occasion wherein light having a wavelength differing from that of light with a prescribed wavelength from that of the light having the prescribed wavelength by a prescribed difference of wavelength is made to enter the objective lens optical system through the coupling optical system.

Structure (2): The optical pickup apparatus according to Structure (1), wherein when light having a wavelength shorter than that of light having the prescribed wavelength is made to enter the objective lens optical system, a position of a focus is on the under side compared with a focus in the case of the light with the prescribed wavelength, and when light having a wavelength shorter than that of light having the prescribed wavelength is made to enter the coupling lens optical system, a position of a focus is on the over side compared with a focus in the case of the light with the prescribed wavelength.

Structure (3): The optical pickup apparatus according to Structure (1), wherein when light having a wavelength shorter than that of light having the prescribed wavelength is made to enter the objective lens optical system, a position of a focus is on the over side compared with a focus in the case of the light with the prescribed wavelength, and when light having a wavelength shorter than that of light having the prescribed wavelength is made to enter the coupling lens optical system, a position of a focus is on the under side compared with a focus in the case of the light with the prescribed wavelength.

Structure (4): The optical pickup apparatus according to Structure (1), wherein the objective lens optical system does not have a diffraction section on the optical surface.

Structure (5): The optical pickup apparatus according to Structure (1), wherein the objective lens optical system is composed of one two-sided aspherical surface lens.

Structure (6): The optical pickup apparatus according to Structure (1), wherein the objective lens optical system is composed of two lenses which have at least one aspherical surface refraction surface.

Structure (7): The optical pickup apparatus according to Structure (1), wherein a numerical aperture of the objective lens optical system on the part of an optical information recording medium is 0.58 or more.

Structure (8): The optical pickup apparatus according to Structure (7), wherein a numerical aperture of the objective lens optical system on the part of an optical information recording medium is 0.65 or more.

Structure (9): The optical pickup apparatus according to Structure (1), wherein a wavelength of the light source is 700 nm or less.

Structure (10): The optical pickup apparatus according to Structure (9), wherein a wavelength of the light source is 600 nm or less.

Structure (11): The optical pickup apparatus according to Structure (1), wherein the coupling optical system is a collimator optical system which converts a light flux emitted from the light source into a light flux which is in parallel substantially with an optical axis.

Structure (12): The optical pickup apparatus according to Structure (1), wherein the coupling optical system makes a divergent angle of a light flux emitted from the light source to be smaller.

Structure (13): The optical pickup apparatus according to Structure (1), wherein the coupling optical system converts a light flux emitted from the light source into a converged light.

Structure (14): The optical pickup apparatus according to Structure (1), wherein the diffraction surface has a diffraction pattern which is almost in a shape of concentric circles, and a minimum pitch Λmin in the diffraction pattern satisfies the following conditional expression;

$$2\lambda < \Lambda min < 100\lambda$$

wherein λ represents a wavelength of a light flux emitted from the light source.

Structure (15): The optical pickup apparatus according to Structure (14), wherein a wavelength of the light source is not more than 450 nm, the diffraction surface has a diffraction pattern which is almost in a shape of concentric circles, and a minimum pitch Λmin in the diffraction pattern satisfies the following conditional expression.

$$2\lambda < \Lambda min < 30\lambda$$

Structure (16): The optical pickup apparatus according to Structure (1), wherein the diffraction surface has a diffraction pattern which is almost in a shape of concentric circles, and a minimum pitch Λmin in the diffraction pattern satisfies the following conditional expression.

$$0.4 \mu m < \Lambda min < 13.5 \mu m$$

Structure (17): The optical pickup apparatus according to Structure (1), wherein a focal length of the coupling optical system for light having a wavelength of 400 nm is in a range from 2 mm to 25 mm.

Structure (18): The optical pickup apparatus according to Structure (1), wherein the coupling optical system has a plastic lens.

Structure (19): A coupling lens used in an optical pickup apparatus comprising a diffraction surface, wherein when light having a wavelength that is shorter than that of light having a prescribed wavelength is made to enter the coupling lens, a position of a focus is on the over side compared with a focus in the case of the light having the prescribed wavelength.

Structure (20): An apparatus for recording and/or reproducing an optical information recording medium which records and/or reproduces information on an optical information recording medium comprising an optical pickup apparatus having a light source emitting a light flux, a light-converging optical system for converging a light flux emitted from the light source including a coupling optical system that changes a divergent angle of a light flux emitted from the light source and an objective lens optical system that converges a light flux emerging from the coupling optical system on the information recording surface of the optical information recording medium, and an optical detector for detecting reflected light or transmitted light coming from the information recording surface of the optical information recording medium, wherein at least one surface of the coupling optical system is provided with a diffraction surface by which the longitudinal spherical aberration on the occasion wherein light having a wavelength differing from that of light with a prescribed wavelength by a prescribed difference of wavelength is made to enter the objective lens optical system through the coupling optical system is made to be smaller, compared with the longitudinal spherical aberration on the occasion wherein light having a wavelength differing from that of light with the prescribed wavelength from that of the light having the prescribed wavelength by the prescribed difference of wavelength is made to enter the objective lens optical system through the coupling optical system.

Further, preferable Structures (21)–(48) are as follows.

Structure (21) of the invention is represented by an optical pickup optical system comprising a coupling optical system that changes. a divergent angle of an incident light and an objective lens optical system that converges a light flux coming from the coupling optical system, wherein at least one surface of the coupling optical system is provided with a diffraction surface by which the longitudinal spherical aberration on the occasion wherein light having a wavelength differing(from that of light with a prescribed wavelength)by a prescribed difference of wavelength is made to enter the coupling optical system through the objective lens optical system is made to be smaller, compared with the longitudinal spherical aberration on the occasion wherein light having a wavelength differing from that of light with a prescribed wavelength by a prescribed difference of wavelength is made to enter the objective lens optical system.

As stated above, in the optical pickup optical system of Structure (21), a diffraction surface is provided on at least one surface of the coupling optical system. It is therefore possible to correct longitudinal spherical aberration generated by the objective lens optical system by the coupling optical system, if there is made an arrangement that a sign of the longitudinal spherical aberration generated by the diffraction surface is opposite to that of the longitudinal spherical aberration generated by the refraction surface of the objective lens optical system, and an amount of the former longitudinal spherical aberration is $(1/mT)^2$ times that of the latter longitudinal spherical aberration. Since the coupling optical system does not have various limitations about the objective lens optical system stated above, it is possible to manufacture the coupling optical system through injection molding, by using resin materials such as plastics. Therefore, it is possible to manufacture an optical pickup optical system easily and at low cost.

In short, the optical pickup optical system of Structure (21) makes it possible to correct longitudinal spherical aberration easily and at low cost, even in the case of using a light source having poor monochromaticity like GaN blue semiconductor laser with a wavelength of about 400 nm, or a light source whose wavelength fluctuates suddenly.

Structure (22) is represented by an optical pickup optical system wherein the objective lens optical system does not have a diffraction surface on its optical surface.

Structure (23) is represented by an optical pickup optical system wherein the objective lens optical system is composed of a two-sided aspherical lens.

Structure (24) is represented by an optical pickup optical system wherein the objective lens optical system is composed of two lenses in which at least one aspherical refraction surface is included.

Structure (25) is represented by an optical pickup optical system which can be applied to the optical pickup optical system described in either one of Structures (21)–(24).

Structure (26) is represented by an optical pickup apparatus comprising at least one light source, a coupling optical system that changes a divergent angle of a divergent light emitted from the light source, and an objective lens optical system that converges a light flux emerging from the coupling optical system on the information recording surface of an optical information recording medium, wherein at least one surface of the coupling optical system is provided with a diffraction surface by which the longitudinal spherical aberration on the occasion wherein light having a wavelength differing(from that of light with a prescribed wavelength)by a prescribed difference of wavelength is made to enter the coupling optical system through the objective lens optical system is made to be smaller, compared with the longitudinal spherical aberration on the occasion wherein light having a wavelength differing from that of light with a prescribed wavelength by a prescribed difference of wavelength is made to enter the objective lens optical system.

Structure (27) is represented by an optical pickup apparatus wherein the objective lens optical system does not have a diffraction surface on its optical surface.

Structure (28) is represented by an optical pickup apparatus wherein the objective lens optical system is composed of a two-sided aspherical lens.

Structure (29) is represented by an optical pickup apparatus wherein the objective lens optical system is composed of two lenses in which at least one aspherical refraction surface is included.

Structure (30) is represented by an optical pickup apparatus wherein a numerical aperture of the objective lens optical system on the part of an optical information recording medium is 0.58 or more.

Structure (31) is represented by an optical pickup apparatus wherein a numerical aperture of the objective lens optical system on the part of an optical information recording medium is 0.65 or more.

Structure (32) is represented by an optical pickup apparatus wherein a wavelength of the light source is 700 nm or less.

Structure (33) is represented by an optical pickup apparatus wherein a wavelength of the light source is 680 nm or less.

Structure (34) is represented by an optical pickup apparatus wherein the coupling optical system is a collimator optical system which converts an incident divergent light flux into a collimated light flux that is substantially in parallel with an optical axis.

Structure (35) is represented by an optical pickup apparatus wherein the coupling optical system converts an incident divergent light flux into a light flux having a smaller divergent angle.

Structure (36) is represented by an optical pickup apparatus wherein the coupling optical system converts an incident divergent light flux into a convergent light flux.

Structure (37) is represented by an optical pickup apparatus wherein the diffraction surface has a diffraction pattern which is almost in a shape of concentric circles and minimum pitch $\Lambda min$ in the diffraction pattern is a value satisfying $2\lambda<\Lambda min<100\lambda$ with a wavelength of the light source represented by $\lambda$, in which $\lambda$ represents a wavelength in the light source.

Structure (38) is represented by an optical pickup apparatus wherein wavelength $\lambda$ in the light source is not more than 450 nm, the diffraction surface has a diffraction pattern which is almost in a shape of concentric circles and minimum pitch $\Lambda min$ in the diffraction pattern is a value satisfying $2\lambda<\Lambda min<100\lambda$.

Structure (39) is represented by an optical pickup optical system which can be applied to the optical pickup apparatus described in either one of Structures (26)–(38).

Structure (40) is represented by a coupling optical system which can be applied to the optical pickup optical system described in Structure (39).

Structure (41) is represented by a coupling optical system lens wherein a diffraction surface having a diffraction pattern which is almost in a shape of concentric circles is provided on at least one side thereof, and minimum pitch $\Lambda min$ of the diffraction pattern is a value satisfying $2\lambda<\Lambda min<30\lambda$ for the wavelength $\lambda$ of 450 nm or less.

Structure (42) is represented by a coupling optical system lens wherein a diffraction surface having a diffraction pattern which is almost in a shape of concentric circles is provided on at least one side thereof, and minimum pitch $\Lambda min$ of the diffraction pattern is a value satisfying $0.4 \mu m<\Lambda min<13.5 \mu m$.

Structure (43) is represented by a coupling optical system lens wherein a wavelength which makes diffraction efficiency to be the maximum is not more than 450 nm.

Structure (44) is represented by a coupling optical system lens wherein focal length f is a value satisfying $2 mm<f<25 mm$ when light having wavelength $\lambda$ of 400 nm is made to enter the coupling optical system lens.

Structure (45) is represented by a coupling optical system lens which is made of plastic.

Structure (46) is represented by a coupling optical system lens wherein a diffraction surface is formed through a photopolymerization method.

Structure (47) is represented by a lens having on at least one side thereof a diffraction surface having a diffraction pattern which is almost in a shape of concentric circles, wherein an absolute value of the longitudinal spherical aberration is greater and a sign thereof is opposite when compared with those of a refraction lens which has the same material, same axial thickness, same focal length and same back focus as those of the aforesaid lens and does not have a diffraction surface.

Structure (48) is represented by a coupling optical system wherein the lens described in Structure (47) is provided.

Structure (49) is represented by a recording/reproducing apparatus which is equipped with an optical pickup apparatus described in either one of Structures (26)–(39) and can record or reproduce at least one of a sound and an image.

Further, preferable Structures (50)–(83) are as follows.

Structure (50) is represented by an optical pickup apparatus for recording/reproducing of information which has therein a light-converging optical system having therein a coupling lens which changes the state of divergence for light fluxes emitted from the first light source with wavelength $\lambda 1$ and the second light source with wavelength $\lambda 2$ and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the first light source and the second light source are unitized, and a diffraction pattern that corrects chromatic aberration of each of a light flux emitted from the light source with wavelength $\lambda 1$ and a light flux emitted from the light source with wavelength $\lambda 2$ is formed on at least one surface of the coupling lens.

Since a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, even when the first light source and the second light source are unitized, and positions of the two light sources are fixed to prevent the two light sources from moving separately in the direction that is in parallel with an optical axis of the light-converging optical system, it is possible to correct chromatic aberration with a diffraction effect of the diffraction pattern, and thereby to conduct excellent recording/reproducing of information. Incidentally, unitization means that the first light source and the second light source are housed and fixed in one package, for example, but without being limited to this, the unitization also include broadly condition where two light sources are fixed to be unable to correct aberration.

As a light source with the first wavelength and a light source with the second wavelength, there are considered various ones such as a blue laser light source and a red laser light source. Further, when there exist three light sources each having a different wavelength, two of them have only to be in the relationship stated above. As a coupling lens, there are also considered, in addition to a single lens, a two-element lens wherein an ordinary lens and a plate member on which a diffraction pattern which hardly has power, for example, are combined, a cemented lens, and a hybrid lens. As a material for the coupling lens, resin is preferable for forming a diffraction pattern, although glass is also considered. The light-converging optical system also includes one which is provided with not only a lens but also a mirror.

Structure (51) is represented by an optical pickup apparatus for recording/reproducing of information which has therein a light-converging optical system having therein a coupling lens which changes the state of divergence for light fluxes emitted from the first light source with wavelength $\lambda 1$ and the second light source with wavelength $\lambda 2$ and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the coupling lens makes a principal ray of light of the light flux incident obliquely from an optical axis of the light-converging optical system among light fluxes emitted from the first light source or the second light source to emerge in the direction that is almost in parallel with the optical axis. Incidentally, the optical axis of the light-converging optical system in the present specifications means an axis passing through the center of the coupling lens, because when the light-converging optical system has therein a mirror, an angle of the optical axis varies in accordance a reflection angle of the mirror. The principal ray of light means a central ray of light of the light flux restricted by an aperture such as a diaphragm.

Since the coupling lens makes a principal ray of light of the light flux incident obliquely from an optical axis of the light-converging optical system among light fluxes emitted from the first light source or the second light source to emerge in the direction that is almost in parallel with the optical axis, even when the light source on one side is arranged at the position where the light flux is not emitted in the direction that is in parallel with an optical axis of the light-converging optical system, the light flux can be emitted in the direction of the optical axis as if such light source is on the optical axis of the light-converging optical system, resulting in better recording/reproducing of information. Incidentally, in Structure (51), it is preferable that the diffraction surface is not made of a ring zone-shaped diffraction surface but a stepwise stripe type diffraction surface.

Structure (52) is represented by an optical pickup apparatus wherein a diffraction pattern is formed on at least one surface of the coupling lens, and therefore, a principal ray of light of the light flux incident obliquely from an optical axis of the light-converging optical system can be made to emerge in the direction that is almost in parallel with an optical axis.

Structure (53) is represented by an optical pickup apparatus for recording/reproducing of information which has therein a light-converging optical system having therein a coupling lens which changes the state of divergence for light fluxes emitted from the first light source with wavelength $\lambda 1$ and the second light source with wavelength $\lambda 2$ and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the coupling lens has off-axis characteristics to correct off-axis coma in the light-converging optical system for the light flux incident obliquely from an optical axis of the light-converging optical system among light fluxes emitted from the first light source or the second light source. Incidentally, coma is a standard deviation value of wavefront aberration.

Essentially, it is preferable to design so that off-axis-optical characteristics of the light-converging optical system are made to be close to the axial optical characteristics as far as possible, to be ready for occurrence of a shifted axis caused by assembling accuracy. However, when a light source is away from the optical axis, a principal ray of light of a light flux emerging from the coupling has an inclination from an optical axis, and coma on a certain level is caused by passage through an objective lens and a transparent base board. Therefore, if it is possible to give inverse coma so that the coma may be canceled by the coupling lens, it is possible to reduce coma of the total light-converging optical system effectively for the light flux incident obliquely from the optical axis of the light-converging optical system, and thereby, to conduct excellent recording/reproducing of information. Incidentally, in the Structure (53), it is preferable that coma is corrected at the diffraction surface.

Structure (54) is represented by an optical pickup apparatus which is preferable because its structure can be simplified and its cost may be lowered when the first light source and the second light source are unitized.

Structure (55) is represented by an optical pickup apparatus for recording/reproducing of information which has therein a light-converging optical system having therein a coupling lens which changes the state of divergence for light fluxes emitted from the first light source with wavelength $\lambda 1$ and the second light source with wavelength $\lambda 2$ and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the first light source and the second light source are unitized, and a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, and the coupling lens makes a principal ray of light of the light flux incident obliquely from an optical axis of the light-converging optical system among light fluxes emitted from the first light source or the second light source to emerge in the direction that is almost in parallel with the optical axis.

Since a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, even when the first light source and the second light source are unitized, and positions of the two light sources are fixed to prevent the two light sources from moving separately in the direction that is in parallel with an optical axis of the light-converging optical system, it is possible to correct chromatic aberration with a diffraction effect of the diffraction pattern, and thereby to conduct excellent recording/reproducing of information. Further, since the coupling lens makes a principal ray of light of the light flux incident obliquely from an optical axis of the light-converging optical system among light fluxes emitted from the first light source or the second light source to emerge in the direction that is almost in parallel with the optical axis, even when the light source on one side is arranged at the position where the light flux is not emitted in the direction that is in parallel with an optical axis of the light-converging optical system, the light flux can be emitted in the direction of the optical axis as if such light source is on the optical axis of the light-converging optical system, resulting in better recording/reproducing of information.

Structure (56) is represented by an optical pickup apparatus wherein the coupling lens is a single lens.

Structure (57) is represented by an optical pickup apparatus wherein only one surface of the coupling lens is provided with a diffraction pattern, and a diffraction effect of the diffraction pattern makes a principal ray of light of the light flux incident obliquely from an optical axis of the light-converging optical system to emerge in the direction that is almost in parallel with the optical axis.

Structure (58) is represented by an optical pickup apparatus wherein a diffraction pattern is provided on each of both sides of the coupling lens, and an effect of diffraction of diffraction patterns on the both sides corrects chromatic aberration, and makes a principal ray of light of the light flux incident obliquely from an optical axis of the light-converging optical system to emerge in the direction that is almost in parallel with the optical axis.

Structure (59) is represented by an optical pickup apparatus wherein the coupling lens has diffraction patterns on its both sides, and an effect of diffraction of the diffraction pattern on one side corrects chromatic aberration, while, an effect of diffraction of the diffraction pattern on the other side makes a principal ray of light of the light flux incident obliquely from an optical axis of the light-converging optical system to emerge in the direction that is almost in parallel with the optical axis.

Structure (60) is represented by an optical pickup apparatus for recording/reproducing of information which has therein a light-converging optical system having therein a coupling lens which changes the state of divergence for light fluxes emitted from the first light source with wavelength $\lambda 1$ and the second light source with wavelength $\lambda 2$ and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the first light source and the second light source are unitized, a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, and the coupling lens has off-axis characteristics to correct off-axis coma in the light-converging optical system for the light flux incident obliquely from an optical axis of the light-converging optical system among light fluxes emitted from the first light source or the second light source.

Since a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, even when the first light source and the second light source are unitized, and positions of the two light sources are fixed to prevent the two light sources from moving separately in the direction that is in parallel with an optical axis of the light-converging optical system, it is possible to correct chromatic aberration with a diffraction effect of the diffraction pattern, and thereby to conduct excellent recording/reproducing of information. Further, since the coupling lens makes a principal ray of light of the light flux incident obliquely from an optical axis of the light-converging optical system among light fluxes emitted from the first light source or the second light source to emerge in the direction that is almost in parallel with the optical axis, even when the light source on one side is arranged at the position where the light flux is not emitted in the direction that is in parallel with an optical axis of the light-converging optical system, the light flux can be emitted in the direction of the optical axis as if such light source is on the optical axis of the light-converging optical system, resulting in better recording/reproducing of information. Furthermore, coma on a certain level is caused by passage through an objective lens and a transparent base board on off-axis light which causes a certain image height. Therefore, if it is possible to give inverse coma so that the coma may be canceled by the coupling lens, it is possible to reduce coma of the total light-converging optical system effectively for the light flux incident obliquely from the optical axis of the light-converging optical system, and thereby, to conduct excellent recording/reproducing of information.

Structure (61) is represented by an optical pickup apparatus wherein the wavelength $\lambda 1$ and the wavelength $\lambda 2$ have the relationship of $\lambda 1 < \lambda 2$, and the relationship of $t1 < t2$ holds when a thickness of a transparent base board of the first optical information recording medium is represented by t1 and a thickness of a transparent base board of the second optical information recording medium is represented by t2, thus, recording/reproducing of information can be conducted on different recording media such as, for example, CD and DVD.

Structure (62) is represented by an optical pickup apparatus wherein a light flux emitted from the second light source enters obliquely for an optical axis of the light-converging optical system.

Structure (63) is represented by an optical pickup apparatus wherein the coupling lens is a collimator which converges a incident divergent light flux to be a collimated light flux which is almost in parallel with an optical axis.

Structure (64) is represented by an optical pickup apparatus coupling lens for recording/reproducing of information which has therein a light-converging optical system having therein a coupling lens which changes the state of divergence for light fluxes emitted from the first light source with wavelength λ1 and the second light source with wavelength λ2 and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the coupling lens makes a principal ray of light of the light flux incident obliquely from an optical axis of the light-converging optical system among light fluxes emitted from the first light source or the second light source to emerge in the direction that is almost in parallel with the optical axis.

Since the coupling lens makes a principal ray of light of the light flux incident obliquely from an optical axis of the light-converging optical system among light fluxes emitted from the first light source or the second light-source to emerge in the direction that is almost in parallel with the optical axis, even when the light source on one side is arranged at the position where the light flux is not emitted in the direction that is in parallel with an optical axis of the light-converging optical system, the light flux can be emitted in the direction of the optical axis as if such light source is on the optical axis of the light-converging optical system, resulting in better recording/reproducing of information.

Structure (65) is represented by an optical pickup apparatus coupling lens wherein a diffraction pattern is formed on at least one surface of the coupling lens, and thereby, an effect of diffraction can make a principal ray of light of the light flux incident obliquely from an optical axis of the light-converging optical system to emerge in the direction that is almost in parallel with the optical axis.

Structure (66) is represented by an optical pickup apparatus coupling lens for recording/reproducing of information which has therein a light-converging optical system having therein a coupling lens which changes the state of divergence for light fluxes emitted from the first light source with wavelength λ1 and the second light source with wavelength λ2 and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the coupling lens has off-axis characteristics to correct off-axis coma in the light-converging optical system for the light flux incident obliquely from an optical axis of the light-converging optical system among light fluxes emitted from the first light source or the second light source.

Essentially, it is preferable to design so that off-axis optical characteristics of the light-converging optical system are made to be close to the axial optical characteristics as far as possible, to be ready for occurrence of a shifted axis caused by assembling accuracy. However, when a light source is away from the optical axis, a principal ray of light of a light flux emerging from the coupling has an inclination from an optical axis, and coma on a certain level is caused by passage through an objective lens and a transparent base board. Therefore, if it is possible to give inverse coma so that the coma may be canceled by the coupling lens, it is possible to reduce coma of the total light-converging optical system effectively for the light flux incident obliquely from the optical axis of the light-converging optical system, and thereby, to conduct excellent recording/reproducing of information.

Structure (67) is represented by an optical pickup apparatus coupling lens which is preferable because its structure can be simplified and its cost may be lowered when the first light source and the second light source are unitized.

Structure (68) is represented by an optical pickup apparatus coupling lens for recording/reproducing of information which has therein a light-converging optical system having therein a coupling lens which changes the state of divergence for light fluxes emitted from the first light source with wavelength λ1 and the second light source with wavelength λ2 and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the first light source and the second light source are unitized, and a diffraction pattern that corrects chromatic aberration of each of a light flux emitted from the light source with wavelength λ1 and a light flux emitted from the light source with wavelength λ2 is formed on at least one surface of the coupling lens, and the coupling lens makes a principal ray of light of the light flux incident obliquely from an optical axis of the light-converging optical system among light fluxes emitted from the first light source or the second light source to emerge in the direction that is almost in parallel with the optical axis.

Since a diffraction pattern that corrects chromatic aberration of each of a light flux emitted from the light source with wavelength λ1 and a light flux emitted from the light source with wavelength λ2 is formed on at least one surface of the coupling lens, even when the first light source and the second light source are unitized, and positions of the two light sources are fixed to prevent the two light sources from moving separately in the direction that is in parallel with an optical axis of the light-converging optical system, it is possible to correct chromatic aberration with a diffraction effect of the diffraction pattern, and thereby to conduct excellent recording/reproducing of information. Further, since the coupling lens makes a principal ray of light of the light flux incident obliquely from an optical axis of the light-converging optical system among light fluxes emitted from the first light source or the second light source to emerge in the direction that is almost in parallel with the optical axis, even when the light source on one side is arranged at the position where the light flux is not emitted in the direction that is in parallel with an optical axis of the light-converging optical system, the light flux can be emitted in the direction of the optical axis as if such light source is on the optical axis of the light-converging optical system, resulting in better recording/reproducing of information.

Structure (69) is represented by a coupling lens which is a single lens.

Structure (70) is represented by an optical pickup apparatus coupling lens which has, on its one surface only, a diffraction pattern, and an effect of diffraction of the diffraction pattern makes a principal ray of light of the light flux incident obliquely from an optical axis of the light-converging optical system to emerge in the direction that is almost in parallel with the optical axis.

Structure (71) is represented by an optical pickup apparatus coupling lens wherein diffraction patterns are provided on both sides of the coupling lens, and an effect of diffraction on the both sides corrects chromatic aberration, and makes a principal ray of light of the light flux incident obliquely from an optical axis of the light-converging optical system to emerge in the direction that is almost in parallel with the optical axis.

Structure (72) is represented by an optical pickup apparatus coupling lens wherein diffraction patterns are provided on both sides of the coupling lens, and an effect of diffraction of the diffraction pattern on one side corrects chromatic aberration, and an effect of diffraction of the diffraction pattern on the other side makes a principal ray of light of the light flux incident obliquely from an optical axis of the light-converging optical system to emerge in the direction that is almost in parallel with the optical axis.

Structure (73) is represented by an optical pickup apparatus coupling lens for recording/reproducing of information which has therein a light-converging optical system having therein a coupling lens which changes the state of divergence for light fluxes emitted from the first light source with wavelength $\lambda 1$ and the second light source with wavelength $\lambda 2$ and an objective lens for converging the light flux whose state of divergence has been changed on the recording surface of an optical information recording medium, and a detector for detecting reflected and/or transmitted light from the recording surface, and can record and/or reproduce information for the first and second optical information recording media each having a different thickness of a transparent base board, wherein the first light source and the second light source are unitized, and a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, and the coupling lens has off-axis characteristics to correct off-axis coma in the light-converging optical system for the light flux incident obliquely from an optical axis of the light-converging optical system among light fluxes emitted from the first light source or the second light source.

Since a diffraction pattern that corrects chromatic aberration of each of a light flux emitted from the light source with wavelength $\lambda 1$ and a light flux emitted from the light source with wavelength $\lambda 2$ is formed on at least one surface of the coupling lens, even when the first light source and the second light source are unitized, and positions of the two light sources are fixed to prevent the two light sources from moving separately in the direction that is in parallel with an optical axis of the light-converging optical system, it is possible to correct chromatic aberration with a diffraction effect of the diffraction pattern, and thereby to conduct excellent recording/reproducing of information. Further, since the coupling lens makes a principal ray of light of the light flux incident obliquely from an optical axis of the light-converging optical system among light fluxes emitted from the first light source or the second light source to emerge in the direction that is almost in parallel with the optical axis, even when the light source on one side is arranged at the position where the light flux is not emitted in the direction that is in parallel with an optical axis of the light-converging optical system, the light flux can be emitted in the direction of the optical axis as if such light source is on the optical axis of the light-converging optical system, resulting in better recording/reproducing of information. Furthermore, coma on a certain level is caused by passage through an objective lens and a transparent base board on off-axis light which causes a certain image height. Therefore, if it is possible to give inverse coma so that the coma may be canceled by the coupling lens, it is possible to reduce coma of the total light-converging optical system effectively for the light flux incident obliquely from the optical axis of the light-converging optical system, and thereby, to conduct excellent recording/reproducing of information.

Structure (74) is represented by an optical pickup apparatus coupling lens wherein the wavelength $\lambda 1$ and the wavelength $\lambda 2$ have the relationship of $\lambda 1 < \lambda 2$, and the relationship of $t1 < t2$ holds when a thickness of a transparent base board of the first optical information recording medium is represented by t1 and a thickness of a transparent base board of the second optical information recording medium is represented by t2, thus, recording/reproducing of information can be conducted on different recording media such as, for example, CD and DVD.

Structure (75) is represented by an optical pickup apparatus coupling lens wherein a light flux emitted from the second light source enters obliquely for an optical axis of the light-converging optical system.

Structure (76) is represented by an optical pickup apparatus coupling lens wherein the coupling lens is a collimator which converges a incident divergent light flux to be a collimated light flux which is almost in parallel with an optical axis.

Structure (77) is represented by a coupling lens that changes the state of divergence of a light flux, wherein a principal ray of light of the light flux incident obliquely from an optical axis of the coupling lens is made to emerge in the direction that is almost in parallel with the optical axis of the coupling lens.

Since the coupling lens is arranged to make a principal ray of light of the light flux incident obliquely from an optical axis of the coupling lens to emerge in the direction that is almost in parallel with the optical axis, even when the light source is arranged at the position where the light flux is not emitted in the direction that is in parallel with the optical axis of the coupling lens, light-converging optical system, the light flux can be emitted in the direction of the optical axis as if such light source is on the optical axis of the light-converging optical system, resulting in better recording/reproducing of information in an optical pickup apparatus.

Structure (78) is represented by a coupling lens wherein a diffraction pattern is formed on at least one surface of the coupling lens.

Structure (79) is represented by a coupling lens changing the state of divergence of a light flux wherein a diffraction pattern that corrects chromatic aberration in light fluxes emitted from at least two light sources each having a different wavelength is formed on at least one surface of the coupling lens, and among two light fluxes each having a different wavelength, a principal ray of light of the light flux incident obliquely from an optical axis of the coupling lens is made to emerge in the direction that is almost in parallel with the optical axis of the coupling lens.

Since a diffraction pattern that corrects chromatic aberration of light fluxes emitted from light sources each having a different is formed on at least one surface of the coupling lens, even when positions of the two light sources are fixed to prevent the two light sources from moving separately in the direction that is in parallel with an optical axis of the coupling lens, it is possible to correct chromatic aberration with a diffraction effect of the diffraction pattern, and thereby to conduct excellent recording/reproducing of information. Further, since the coupling lens is arrange to make a principal ray of light of the light flux incident obliquely from an optical axis of the coupling lens among light fluxes emitted from light sources each having a different wavelength to emerge in the direction that is almost in parallel with the optical axis, even when the light source on one side is arranged at the position where the light flux is not emitted in the direction that is in parallel with an optical axis of the light-converging optical system, it is possible to emit the light flux in the direction of the optical axis as if such light source is on the optical axis of the light-converging optical system, and thereby to conduct better recording/reproducing of information.

Structure (80) is represented by a coupling lens which is a single lens.

Structure (81) is represented by a coupling lens wherein only one surface of the coupling lens is provided with a diffraction pattern, and a diffraction effect of the diffraction pattern makes a principal ray of light of the light flux incident obliquely from an optical axis of the coupling lens to emerge in the direction that is almost in parallel with the optical axis of the coupling lens.

Structure (82) is represented by a coupling lens wherein both surfaces of the coupling lens are provided with a diffraction pattern which corrects chromatic aberration, and a diffraction effect of the diffraction patterns on the both surfaces makes a principal ray of light of the light flux incident obliquely from an optical axis of the coupling lens to emerge in the direction that is almost in parallel with the optical axis of the coupling lens.

Structure (83) is represented by a coupling lens wherein both surfaces of the coupling lens are provided with a diffraction pattern, and chromatic aberration is corrected by a diffraction effect of the diffraction pattern on the surface on one side, while a diffraction effect of the diffraction pattern on the surface on the other side which corrects chromatic aberration, and a diffraction effect of the diffraction patterns on the both surfaces makes a principal ray of light of the light flux incident obliquely from an optical axis of the coupling lens to emerge in the direction that is almost in parallel with the optical axis of the coupling lens.

BRIEF DESCRIPTION OF THE DRAWINGS

FIGS. 3(a) and 3(b) represent graphs wherein FIG. 3(a) shows longitudinal chromatic aberration, while, FIG. 3(b) shows astigmatism, both caused on a coupling optical system used for an optical pickup optical system in Example 1 of the invention.

FIGS. 6(a) and 6(b) represent graphs wherein FIG. 6(a) shows longitudinal chromatic aberration, while, FIG. 6(b) shows astigmatism, both caused on a coupling optical system used for an optical pickup optical system in Example 2 of the invention.

FIGS. 9(a) and 9(b) represent graphs wherein FIG. 9(a) shows longitudinal chromatic aberration, while, FIG. 9(b) shows astigmatism, both caused on a coupling optical system used for an optical pickup optical system in Example 3 of the invention.

FIGS. 13(a) and 13(b) represent graphs wherein FIG. 13(a) shows longitudinal chromatic aberration, while, FIG. 13(b) shows astigmatism, both caused on a coupling optical system used for an optical pickup optical system in Example 4 of the invention.

FIGS. 16(a) and 16(b) represent graphs wherein FIG. 16(a) shows longitudinal chromatic aberration, while, FIG. 16(b) shows astigmatism, both caused on a coupling optical system used for an optical pickup optical system in Example 5 of the invention.

DETAILED DESCRIPTION OF THE PREFERRED EMBODIMENT

Figure 1:
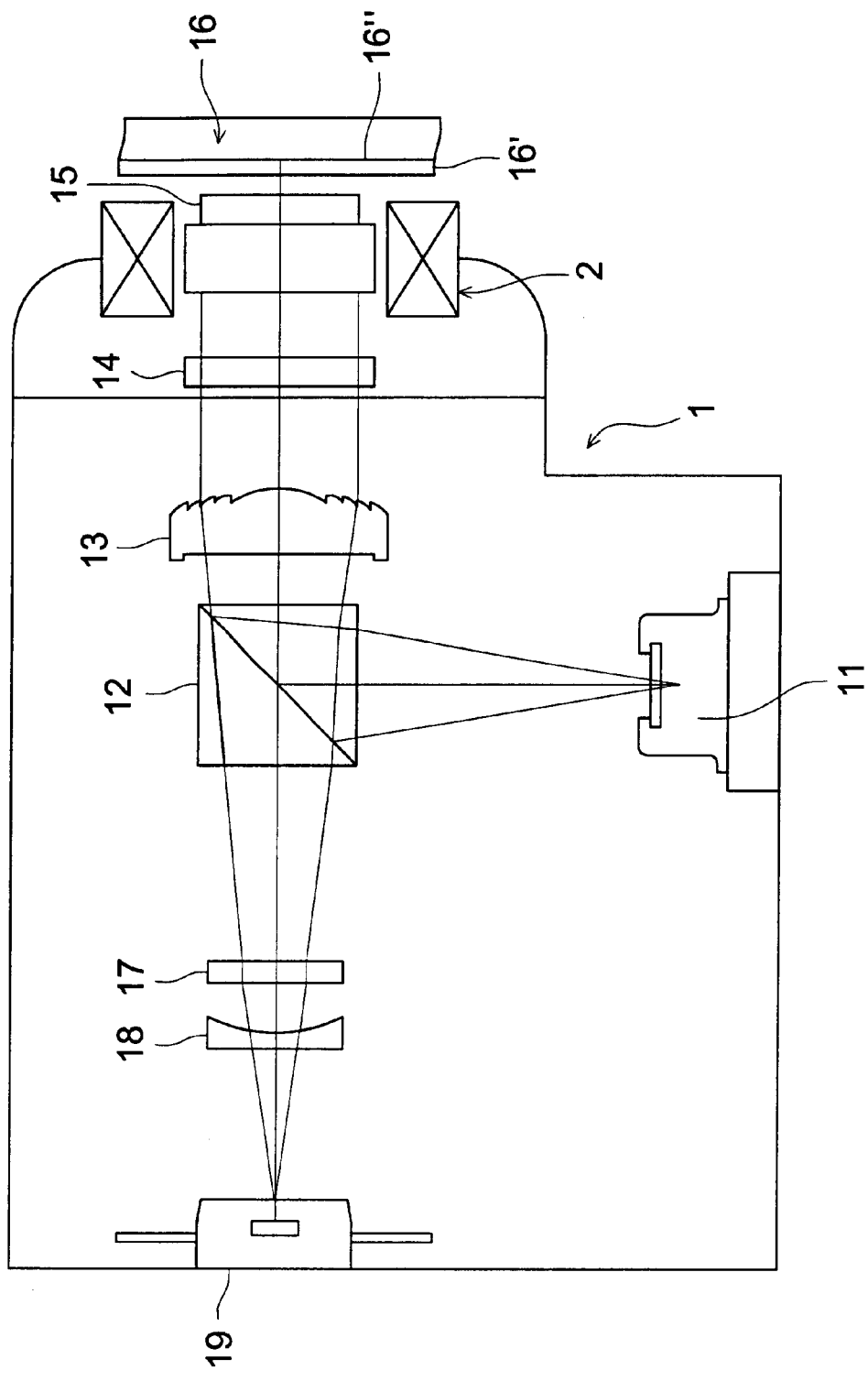
FIG. 1 is a diagram showing schematically the structure of an optical pickup apparatus containing an optical pickup optical system relating to an embodiment of the invention.

In the invention, "an objective lens optical system" means, in a narrow sense, a lens system having a light-converging function which is arranged to be closest to an optical information recording medium and to face it. The objective lens optical system may either be equipped with plural lenses, or be equipped with only one lens.

Further, "a coupling optical system" means a lens system which is structured separately from the objective lens optical system, and receives a divergent light flux emitted from a light source directly or indirectly, and has a function to change a divergent angle of the divergent light flux, and for example, it includes the so-called collimator optical system which converts a divergent light flux from a light source into a collimated light flux that is almost in parallel with an optical axis. The objective lens optical system and/or the coupling optical system may also be a single lens, and in that case, it is possible to reduce the number of constitutional elements of an optical system, and thereby, to structure the optical system to be small in size and to be low at cost. "The coupling optical system" may naturally be composed of plural lenses. A coupling lens used for "the coupling optical system" may either be a glass lens or be a plastic lens, but from the viewpoint of lightness, a plastic lens is preferable. It may also be a hybrid lens wherein a resin layer is provided on the surface of the glass lens.

"A diffraction surface" means a surface having a function to change an angle of a ray of light, such as the surface of an optical element, for example, the surface of a lens provided with a relief for converging or diverging a light flux by diffraction. When an area to cause diffraction and an area to cause no diffraction are present on the same optical surface, the area causing diffraction is called the diffraction surface. An example of a shape of the relief is one represented by a ring zone which is formed on the surface of an optical element to be almost in a shape of a concentric circle whose center is on an optical axis, and shows a serrated form when its section is viewed in the plane including an optical axis.

In the invention, optical information recording media include various CDs such as, for example, CD, CD-R, CD-RW, CD-Video and CD-ROM, various DVDs such as DVD, DVD-ROM, DVD-RAM, DVD-R and DVD-RW, or existing disk-shaped optical information recording media such as MD, plus advanced recording media. A transparent base board is present on the information recording surface of each of many optical information recording media. However, an optical information recording medium may also have no transparent base board.

In the invention, recording of information means recording information on the information recording surface of an information recording medium as that stated above and reproducing of information means reproducing of information recorded on the information recording surface. An optical system of the invention may either be one used for only recording or reproducing, or be one used for both recording and reproducing. Further, the optical system may either be one used for recording for a certain information recording medium and used for reproducing for another information recording medium, or be one used for recording or reproducing for a certain information recording medium and used for recording and reproducing for another information recording medium. Incidentally, reproducing mentioned here is one including simply reading of information.

With regard to diffraction efficiency, the rate of a quantity of diffraction light in each degree for all of diffraction light is obtained by calculation through simulation wherein a wavelength of light for irradiation is set to the prescribed wavelength, based on a shape (shape of a relief) on the diffraction surface.

An optical pickup apparatus of the invention can be carried by an apparatus for recording and/or reproducing of sound and/or image such as a player, a drive, an AV equipment represented by combination of the foregoing, personal computer and other information terminals, all compatible with optical information recording media such as, for example, CD, CD-R, CD-RW, CD-Video, CD-ROM, DVD, DVD-ROM, DVD-RAM, DVD-R, DVD-RW and MD. This apparatus for recording and/or reproducing may also be called an optical information recording medium recording and/or reproducing apparatus in the specifications. Though this optical information recording medium recording and/or reproducing apparatus has therein an optical pickup apparatus of the invention, it is preferable that the optical information recording medium recording and/or reproducing apparatus also has a spindle motor which rotates an optical information recording medium.

A preferable embodiment will now be explained as follows, referring to drawings.

FIG. 1 is a diagram showing schematically the structure of an optical pickup apparatus containing an optical pickup optical system relating to an embodiment of the invention. Optical pickup apparatus 1 has therein semiconductor laser 11 representing a light source, diffraction-integral type collimator 13 representing a coupling optical system and objective lens 15 representing an objective lens optical system.

The semiconductor laser 11 is a blue laser which emits a light flux having a wavelength of about 400 nm. A wavelength of a light flux emitted from the semiconductor laser 11, on the other hand, may also be not more than 700 nm or not more than 680 nm. It is preferable that it is not more than 600 nm. The diffraction-integral type collimator 13 converts a divergent light flux emitted from the semiconductor laser 11 into a collimated light flux that is in parallel with an optical axis. Incidentally, in place of the diffraction-integral type collimator 13, it is possible to provide an optical system for making a divergent angle of a divergent light flux from the semiconductor laser 11 to be smaller and an optical system for converting a divergent light flux from the semiconductor laser 11 into a collimated light flux, and to provide a diffraction pattern on at least one surface of these optical systems.

Further, on the surface of the diffraction-integral type collimator 13 on the part of objective lens 15, there is provided a diffraction pattern which is almost in a shape of concentric circles. This pattern is formed so that its minimum pitch $\Lambda$min may satisfy $2\lambda < \Lambda\text{min} < 100\lambda$ for wavelength $\lambda$ of the semiconductor laser 11, and satisfy preferably $2\lambda < \Lambda\text{min} < 30\lambda$ for wavelength $\lambda$ of 450 nm or less. To be concrete, it is preferable that minimum pitch $\Lambda$min of the diffraction pattern satisfies $0.4\ \mu\text{m} < \Lambda\text{min} < 13.5\ \mu\text{m}$, preferably, $2\ \mu\text{m} < \Lambda\text{min} < 13.5\ \mu\text{m}$. Further, it is preferable that focal length f of the diffraction-integral type collimator 13 satisfies $2\ \text{mm} < f < 25\ \text{mm}$ when light having wavelength $\lambda$ of 400 nm is caused to enter. Incidentally, the diffraction pattern that is almost in a shape of concentric circles may also be provided on the surface opposite to objective lens 15 on the diffraction-integral type collimator 13. Though the diffraction pattern of the diffraction-integral type collimator 13 is made to be almost in a shape of concentric circles having their centers on an optical axis, it is also possible to prove a diffraction pattern other than one mentioned above.

The objective lens 15 is a lens that converges a light flux emerging from the diffraction-integral type collimator 13 on information recording surface 16" of optical disk 16, and it does not have a diffraction surface on its optical surface. The objective lens 15 is composed of two lenses wherein at least one lens surface is provided with an aspherical refraction surface. It is preferable that a numerical aperture of the objective lens 15 closer to optical disk 16 is 0.58 or more, and it is more preferable that it is 0.65 or more.

A divergent light flux emitted from the semiconductor laser 11 is reflected on polarization beam splitter 12, then, is transmitted through the diffraction-integral type collimator 13 and ¼ wavelength plate 14 to become a collimated light flux of circularly polarized light, and is formed by the objective lens 15 on information recording surface 16" to be a spot through transparent base board 16' of high density recording disk 16. The objective lens 15 is controlled by actuator 2 arranged around the objective lens, in terms of focus and tracking. In the present embodiment, the objective lens 15 which is assumed to be a combination lens of two or more elements may also be one two-sided aspherical lens.

A reflected light flux modulated by information pit on information recording surface 16" is made to be a converged light flux again by the objective lens 15, ¼ wavelength plate 14 and diffraction-integral type collimator 13, then, is transmitted through polarization beam splitter 12 and passes through cylindrical lens 17 and concave lens 18 to be given astigmatism and to be subjected to magnification change, and is converged on optical detector 19. Thus, it is possible to read information recorded on optical disk 16 by the use of output signals of the optical detector 19.

In the present embodiment, the diffraction-integral type collimator 13 generates, due to the diffraction pattern that is almost in a shape of concentric circles as stated above provided on its optical surface, longitudinal chromatic aberration that is in relationship that a sign thereof is opposite to that of objective lens 15 and an amount thereof is $(1/mT)^2$ times that of objective lens 15, for oscillation wavelength of the semiconductor laser 11. Therefore, a light flux emitted from the semiconductor laser 11 passes through the diffraction-integral type collimator 13 and the objective lens 15 to be converged on information recording surface 16" of optical disk 16 to be mostly free from longitudinal chromatic aberration.

Namely, at least one surface of the coupling optical system is provided with a diffraction surface which makes longitudinal chromatic aberration generated when light with a wavelength differing by prescribed wavelength difference from prescribed light with wavelength is made to enter an objective lens through a coupling optical system to be smaller than longitudinal chromatic aberration generated when light with a wavelength differing by prescribed wavelength difference from prescribed light with wavelength is made to enter an objective lens.

Further, in many cases including Examples in the present specifications, it is preferable that a focus on the occasion when light with a wavelength that is shorter than that of prescribed light is made to enter an objective lens is on the under side compared with a focus on the occasion of light with prescribed wavelength, while, on the other side, a focus on the occasion when light with a wavelength that is shorter than that of prescribed light is made to enter a coupling lens optical system is on the over side compared with a focus on the occasion of light with prescribed wavelength.

However, it is also possible to arrange so that a focus on the occasion when light with a wavelength that is shorter than that of prescribed light is made to enter an objective lens is on the over side compared with a focus on the occasion of light with prescribed wavelength, while, on the other side, a focus on the occasion when light with a wavelength that is shorter than that of prescribed light is made to enter a coupling lens optical system is on the under side compared with a focus on the occasion of light with prescribed wavelength.

With regard to the diffraction-integral type collimator 13, a numerical aperture is small, a curvature of an optical surface is relatively small, and a demand for making it to be thin and small for security of an operation distance and for light weight is not strong, which is different from an objective lens. It is therefore possible to produce plastic diffraction-integral type collimator 13 easily and at low cost through injection molding employing a mold.

An optical pickup apparatus of the invention can be carried by an apparatus for recording and/or reproducing of sound and/or image such as a player, a drive, an AV equipment represented by combination of the foregoing, a personal computer and other information terminals, all compatible with optical disks such as, for example, CD, CD-R, CD-RW, CD-Video, CD-ROM, DVD, DVD-ROM, DVD-RAM, DVD-R, DVD-RW and MD. This apparatus for recording and/or reproducing may also be called an optical information recording medium recording and/or reproducing apparatus in the specifications. Though this optical information recording medium recording and/or reproducing apparatus has therein an optical pickup apparatus of the invention, it is preferable that the optical information recording medium recording and/or reproducing apparatus also has a spindle motor which rotates an optical information recording medium.

EXAMPLE

Concrete Examples for an optical pickup optical system will now be explained as follows.

Each lens constituting an optical pickup optical system in Examples 1–5 has, on its optical surface, an aspherical form represented by following Expression (A)

$$Z = \frac{h^2/R_0}{1 + \sqrt{1 - (1+\kappa)(h/R_0)^2}} + \sum_{i=1}^{\infty} Aih^{Pi} \quad \text{Expression (A)}$$

In the above expression, Z represents an axis in the direction of optical axis, h represents an axis in the direction perpendicular to the optical axis (height from an optical axis: direction of light advancement is positive), $R_0$ represents paraxial curvature, κ represents the constant of the cone, Ai represents the constant of the aspheric surface, and Pi represents an exponent of the aspheric surface.

On the surface on one side of a coupling lens constituting the optical pickup optical system in Examples 1–5, there is provided a diffraction pattern in a saw-tooth shape to be almost in a shape of concentric circles around an optical axis (diffraction ring zone: ring-zonal diffraction surface). In general, a pitch of the diffraction ring zone is defined by the use of a phase difference function or an optical path difference function. To be concrete, the phase difference function φB is expressed by following Expression (B) with a unit of radian, and optical path difference function φb is expressed by following Expression (C) with a unit of millimeter. Incidentally, ring-zonal minimum pitches of diffraction patterns in Examples 1–5 are respectively 5.1 μm, 5.4 μm, 5.9 μm, 3.0 μm and 3.0 μm.

$$\Phi_B = \sum_{i=1}^{\infty} B_{2i} h^{2i} \quad \text{Expression (B)}$$

$$\Phi_b = \sum_{i=1}^{\infty} b_{2i} h^{2i} \quad \text{Expression (C)}$$

These two methods of expression are different from each other in terms of a unit, but they are the same in terms of meaning to express a pitch of diffraction ring zone. Namely, if coefficient B of the phase difference function whose unit is radian is multiplied by λ/2π for dominant wavelength λ (unit: mm), it is possible to convert to coefficient b of the optical path difference function, while, on the contrary, if coefficient b of the optical path difference function whose unit is mm is multiplied by 2π/λ, it is possible to convert to coefficient B of the phase difference function.

Table 6 shows data relating to an optical pickup optical system of Example 1. In the Example 1, two lenses 115 composed of FCD1 was used as an objective lens optical system, and HOE collimator 113 which is made of olefine resin and has a diameter of 4 mm was used as a coupling optical system. Incidentally, i represents a surface number, ri represents a radius of curvature, and di represents a surface separation.

Figure 2:
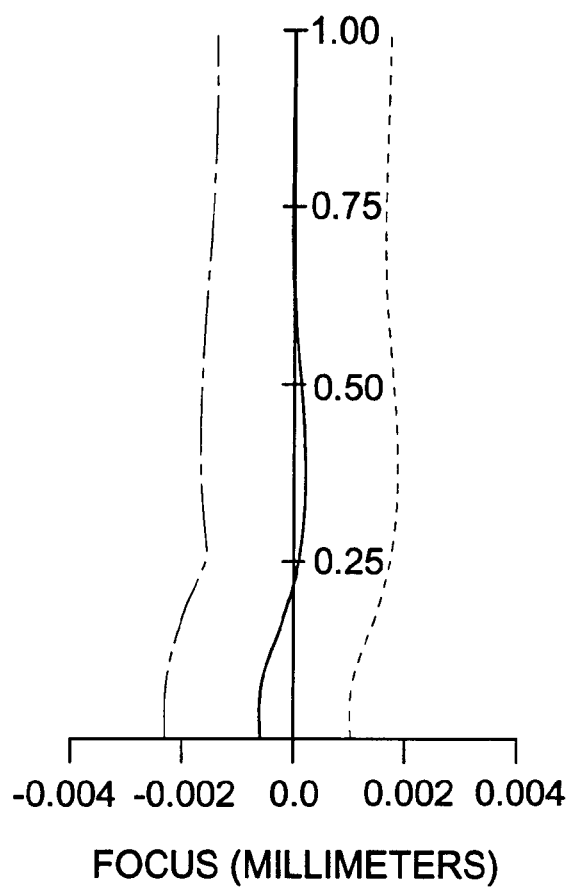
FIG. 2 is a graph showing longitudinal chromatic aberration (longitudinal chromatic aberration) caused on an objective lens optical system used for an optical pickup optical system in Example 1 of the invention.
Figure 3:
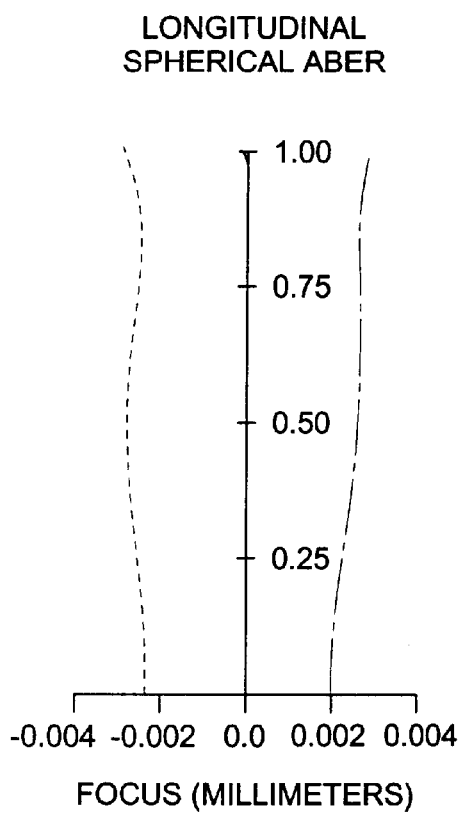
Figure 3:
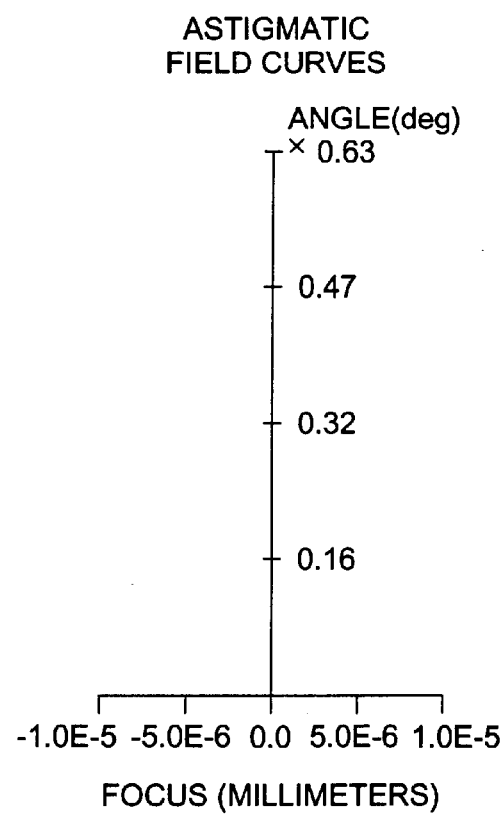
Figure 4:
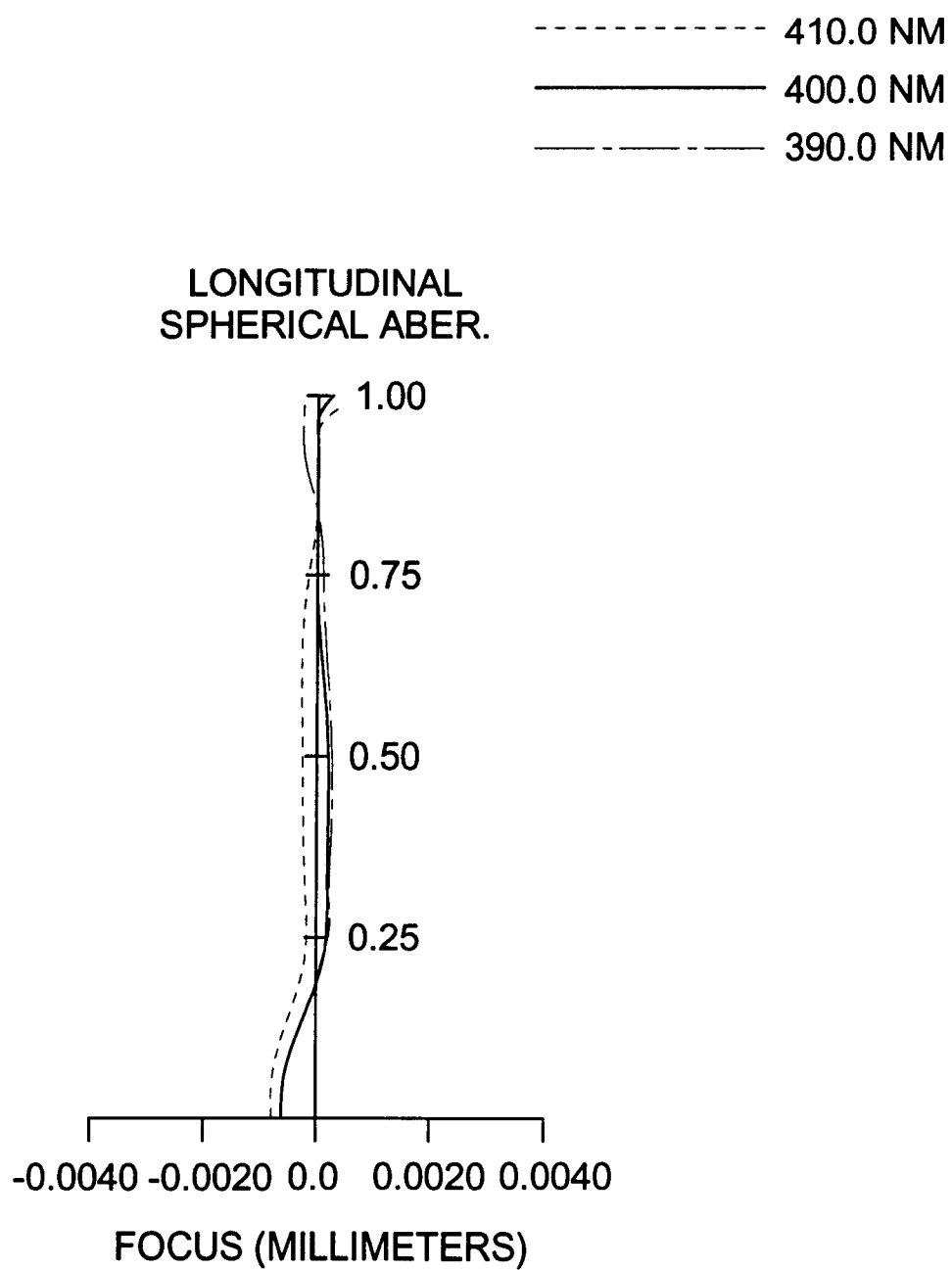
FIG. 4 is a graph showing longitudinal aberration caused on the total optical pickup optical system in Example 1 of the invention.
Figure 5:
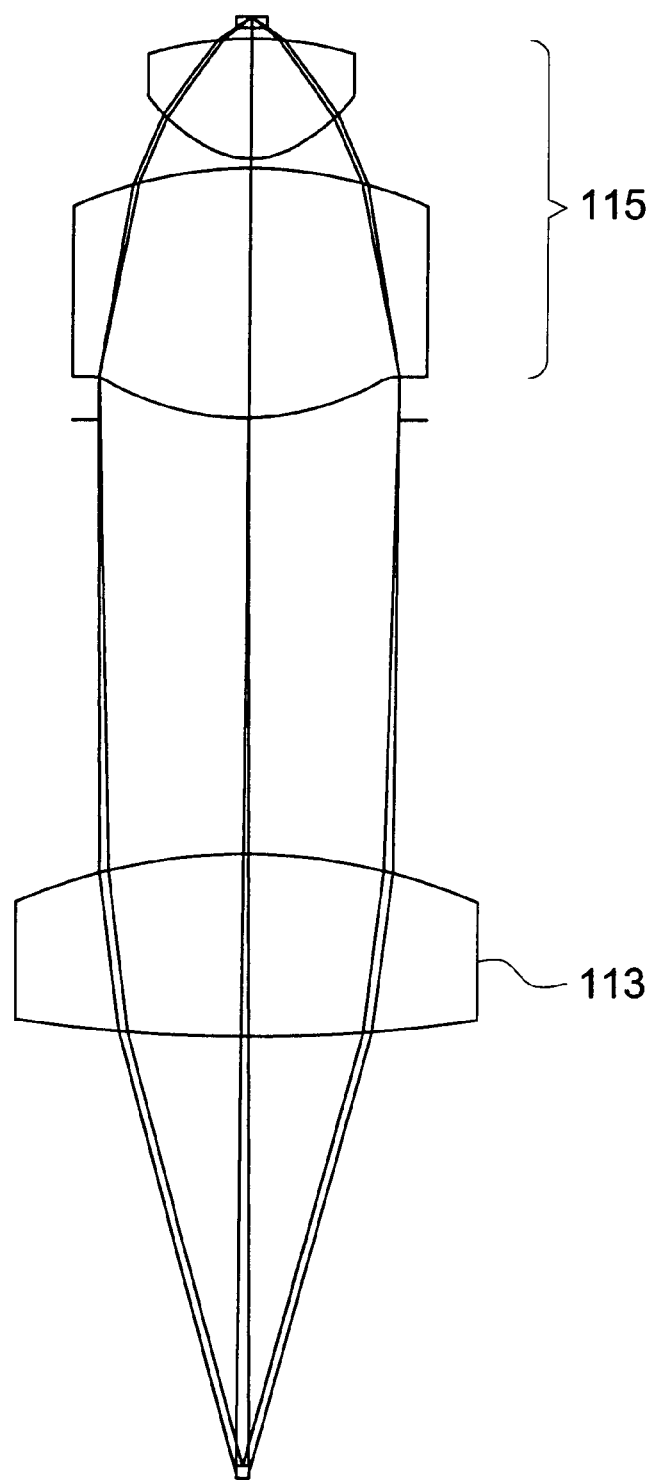
FIG. 5 is an optical path diagram of an optical pickup optical system in Example 1 of the invention.

FIG. 5 shows an optical path diagram of an optical pickup optical system in Example 1. FIG. 2 is a diagram showing longitudinal spherical aberration (or longitudinal chromatic aberration) for wavelength 400±10 nm in individual objective lens optical system used for the optical pickup optical system in Example 1, and it shows that the focus is shifted to the under side when a wavelength is short. FIGS. 3(a) and 3(b) represent graphs wherein FIG. 3(a) shows longitudinal spherical aberration, while, FIG. 3(b) shows astigmatism, both caused, for wavelength of 400±10 nm, on an individual coupling optical system used for an optical pickup optical system in Example 1, and the graph of the longitudinal spherical aberration shows that the focus is shifted to the under side when a wavelength is long. FIG. 4 is a graph showing longitudinal spherical aberration for wavelength of 400±10 nm caused on the total optical pickup optical system in Example 1, and it shows that a back focus is not shifted independently of a wavelength.

TABLE 6

| fobj = 1.76 (NA0.85) | fcol = 6.16 (NA0.32) | mT = −1/3.5 | |
| --- | --- | --- | --- |
| | $\lambda$ = 400 nm | | |
| i | ri | di | Material |
| 1 | ∞ | 5.04 | |
| 2 | 18.15895 | 2.00 | Olefine resin |
| 3 | −5.15409 | 5.00 | |
| 4 | 2.68348 | 2.80 | FCD1 |
| 5 | −5.25523 | 0.10 | |
| 6 | 1.04469 | 1.40 | FCD1 |
| 7 | −4.64195 | 0.13 | |
| 8 | ∞ | 0.1 | PC |

| Aspherical surface data | | | | |
| --- | --- | --- | --- | --- |
| 2nd surface | Aspherical surface coefficient | | | |
| | $\kappa$ | −3.50754E+01 | | |
| | A1 | −2.48733E−04 | P1 | 4.0 |
| | A2 | −4.45053E−05 | P2 | 6.0 |
| | A3 | 2.54124E−05 | P3 | 8.0 |
| | A4 | −3.16970E−07 | P4 | 10.0 |
| 3rd surface | Aspherical surface coefficient | | | |
| | $\kappa$ | 1.17820E+00 | | |
| | A1 | 5.61650E−03 | P1 | 4.0 |
| | A2 | −1.14670E−03 | P2 | 6.0 |
| | A3 | 1.48730E−03 | P3 | 8.0 |
| | A4 | 2.59880E−06 | P4 | 10.0 |
| | Optical path difference function | | | |
| | B2 | −1.84850E−02 | | |
| | B4 | −1.88790E−03 | | |
| | B6 | 6.79610E−04 | | |
| | B8 | −7.96340E−05 | | |
| 4th surface | Aspherical surface coefficient | | | |
| | $\kappa$ | −3.23672E−01 | | |
| | A1 | −3.53974E−03 | P1 | 4.0 |
| | A2 | −1.60747E−03 | P2 | 6.0 |
| | A3 | −3.15496E−04 | P3 | 8.0 |
| | A4 | 2.51358E−04 | P4 | 10.0 |
| | A5 | −9.20259E−05 | P5 | 12.0 |
| 5th surface | Aspherical surface coefficient | | | |
| | $\kappa$ | −3.34526E+01 | | |
| | A1 | −2.38927E−02 | P1 | 4.0 |
| | A2 | 2.87803E−03 | P2 | 6.0 |
| | A3 | 5.20366E−03 | P3 | 8.0 |
| | A4 | −6.92430E−03 | P4 | 10.0 |
| | A5 | 2.11693E−03 | P5 | 12.0 |
| 6th surface | Aspherical surface coefficient | | | |
| | $\kappa$ | −9.30950E−02 | | |
| | A1 | −1.25797E−02 | P1 | 4.0 |
| | A2 | 5.52713E−02 | P2 | 6.0 |
| | A3 | −1.84808E−01 | P3 | 8.0 |
| | A4 | 2.89972E−01 | P4 | 10.0 |
| | A5 | −2.20549E−01 | P5 | 12.0 |

Example 2

Table 7 shows data relating to an optical pickup optical system of Example 2. In the Example 2, two lenses 115 composed of FCD1 were used as an objective lens optical system in the same way as in Example 1, and collimator 113 made of BK7 was used as a coupling optical system.

Figure 7:
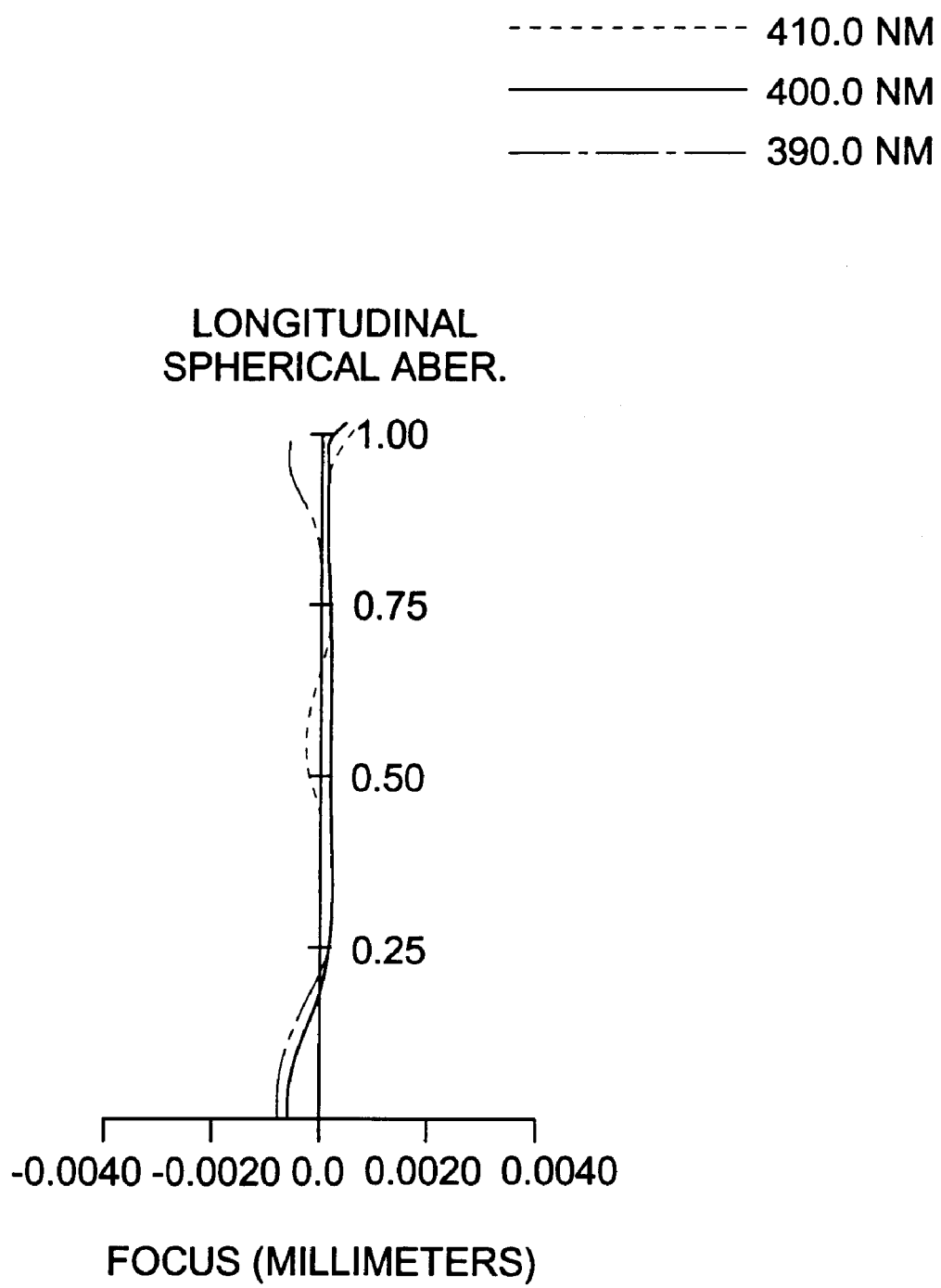
FIG. 7 is a graph showing longitudinal aberration caused on the total optical pickup optical system in Example 2 of the invention.
Figure 8:
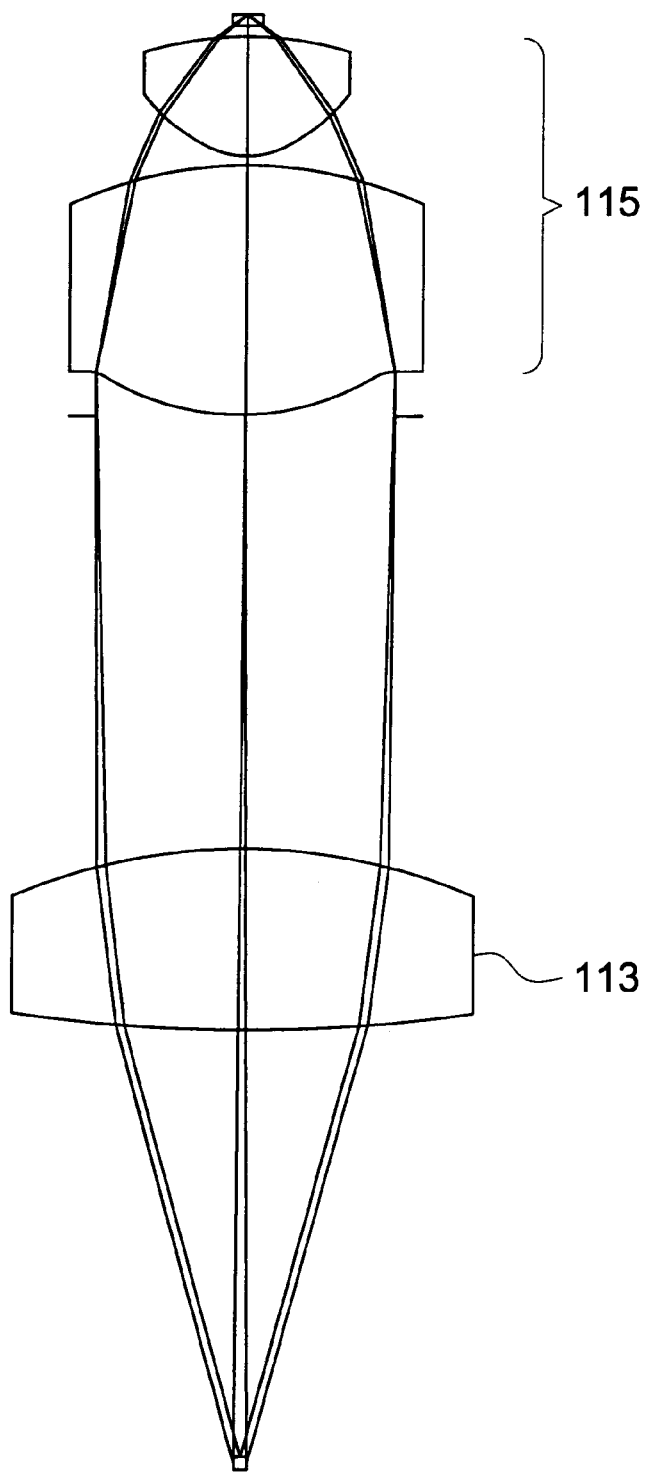
FIG. 8 is an optical path diagram of an optical pickup optical system in Example 2 of the invention.

FIG. 8 shows a diagram of an optical path of an optical pickup optical system in Example 2. FIGS. 6(a) and 6(b) represent graphs wherein FIG. 6(a) shows longitudinal spherical aberration, while, FIG. 6(b) shows astigmatism, both caused for wavelength 400±10 nm on an individual coupling optical system used for an optical pickup optical system in Example 2, and the graph of the longitudinal spherical aberration shows that the focus is shifted to the under side when a wavelength is long. FIG. 7 is a graph showing longitudinal spherical aberration for wavelength of 400±10 nm caused on the total optical pickup optical system in Example 2, and it shows that a back focus is not shifted independently of a wavelength. Incidentally, the objective lens optical system is not illustrated because it is the same as that in FIG. 2.

TABLE 7

| fobj = 1.76 (NA0.85) | fcol = 6.16 (NA0.32) | mT = −1/3.5 | |
| --- | --- | --- | --- |
| | $\lambda$ = 400 nm | | |
| i | ri | di | Material |
| 1 | ∞ | 5.05 | |
| 2 | 18.15895 | 2.00 | BK7 |
| 3 | −4.99615 | 5.00 | |

TABLE 7-continued

| fobj = 1.76 (NA0.85) | fcol = 6.16 (NA0.32) | | mT = −1/3.5 |
|---|---|---|---|
| | $\lambda$ = 400 nm | | |
| i | ri | di | Material |
| 4 | 2.68348 | 2.80 | FCD1 |
| 5 | −5.25523 | 0.10 | |
| 6 | 1.04469 | 1.40 | FCD1 |
| 7 | −4.64195 | 0.13 | |
| 8 | ∞ | 0.1 | PC |

| Aspherical surface data | | | | |
|---|---|---|---|---|
| 2nd surface | Aspherical surface coefficient | | | |
| | $\kappa$ | −3.50754E+01 | | |
| | A1 | −2.48733E−04 | P1 | 4.0 |
| | A2 | −4.45053E−05 | P2 | 6.0 |
| | A3 | 2.54124E−05 | P3 | 8.0 |
| | A4 | −3.16970E−07 | P4 | 10.0 |
| 3rd surface | Aspherical surface coefficient | | | |
| | $\kappa$ | −2.35310E+00 | | |
| | A1 | 1.69820E+01 | P1 | 4.0 |
| | A2 | −1.52000E+01 | P2 | 6.0 |
| | A3 | 1.32250E−04 | P3 | 8.0 |
| | A4 | 6.39210E−07 | P4 | 10.0 |
| | Optical path difference function | | | |
| | B2 | −1.60730E−02 | | |
| | B4 | −2.02440E−03 | | |
| | B6 | 6.67670E−04 | | |
| | B8 | −7.23500E−05 | | |
| 4th surface | Aspherical surface coefficient | | | |
| | $\kappa$ | −3.23672E−01 | | |
| | A1 | −3.53974E−03 | P1 | 4.0 |
| | A2 | −1.60747E−03 | P2 | 6.0 |
| | A3 | −3.15496E−04 | P3 | 8.0 |
| | A4 | 2.51358E−04 | P4 | 10.0 |
| | A5 | −9.20259E−05 | P5 | 12.0 |
| 5th surface | Aspherical surface coefficient | | | |
| | $\kappa$ | −3.34526E+01 | | |
| | A1 | −2.38927E−02 | P1 | 4.0 |
| | A2 | 2.87803E−03 | P2 | 6.0 |
| | A3 | 5.20366E−03 | P3 | 8.0 |
| | A4 | −6.92430E−03 | P4 | 10.0 |
| | A5 | 2.11693E−03 | P5 | 12.0 |
| 6th surface | Aspherical surface coefficient | | | |
| | $\kappa$ | −9.30950E−02 | | |
| | A1 | −1.25797E−02 | P1 | 4.0 |
| | A2 | 5.52713E−02 | P2 | 6.0 |
| | A3 | −1.84808E−01 | P3 | 8.0 |
| | A4 | 2.89972E−01 | P4 | 10.0 |
| | A5 | −2.20549E−01 | P5 | 12.0 |

Example 3

Table 8 shows data relating to an optical pickup optical system of Example 3. In the Example 3, two lenses composed of FCD1 were used as an objective lens optical system in the same way as in Example 1, and a collimator manufactured through a 2P method (photopolymerization method) wherein polyolefine resin is coated on the surface of aspherical lens BK7 was used as a coupling optical system.

Figure 9A:
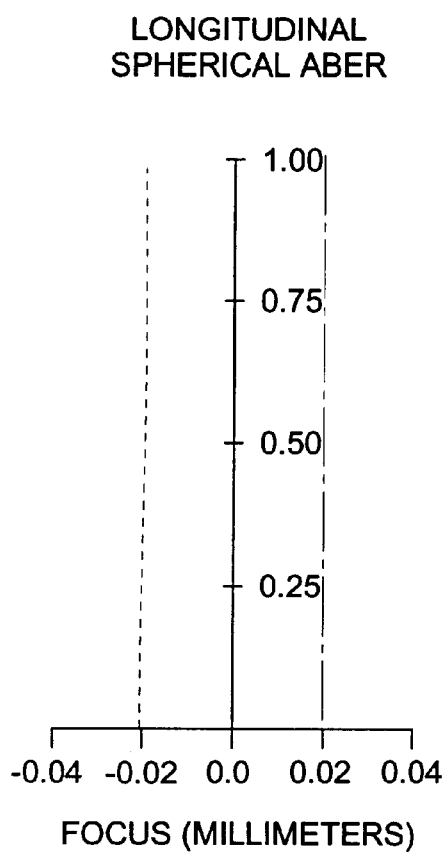
Figure 9B:
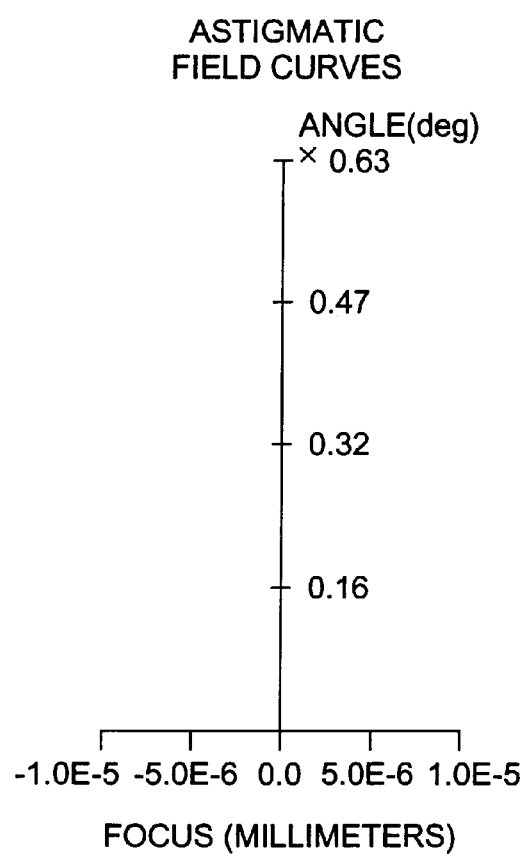
Figure 10:
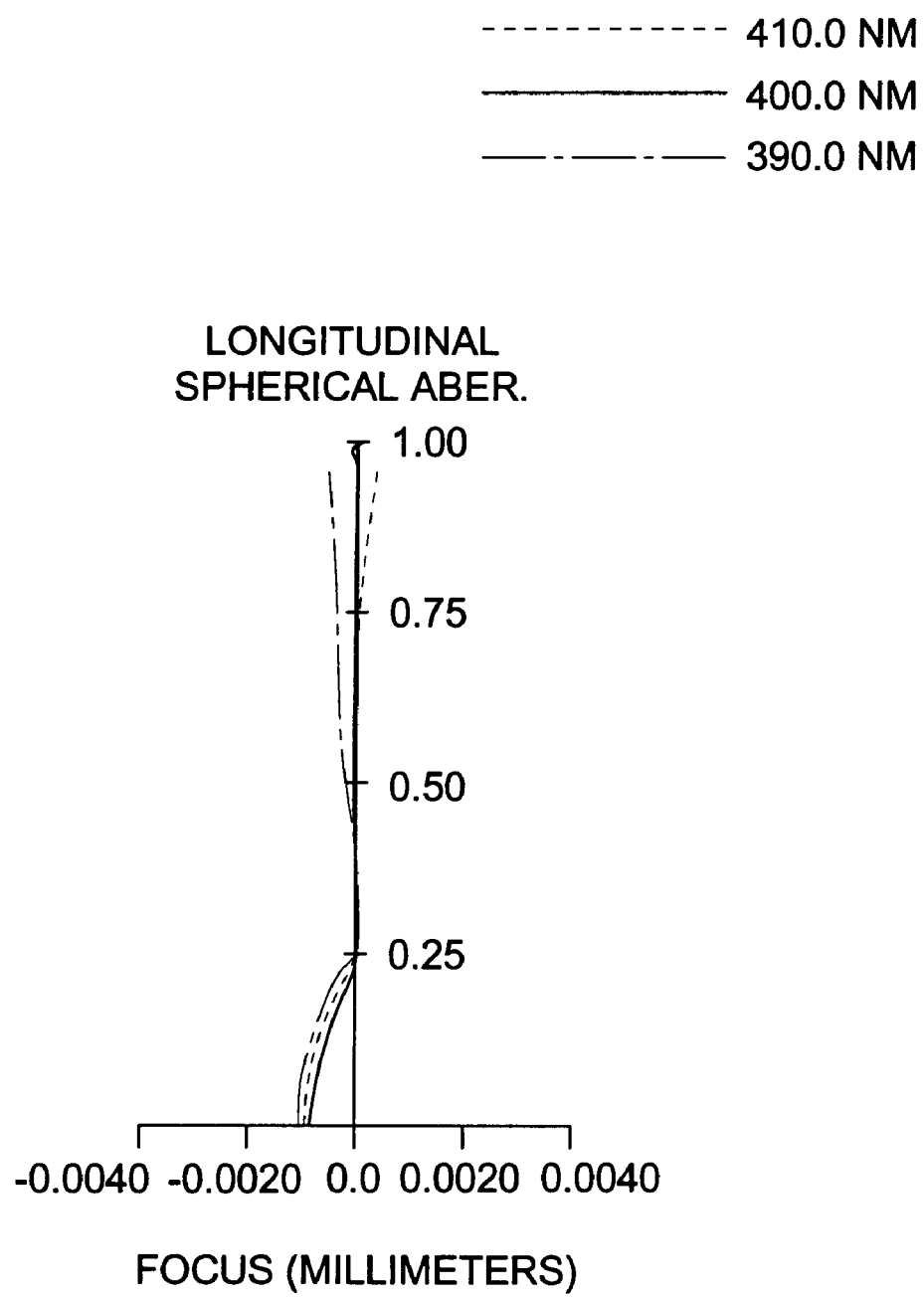
FIG. 10 is a graph showing longitudinal aberration caused on the total optical pickup optical system in Example 3 of the invention.
Figure 11:
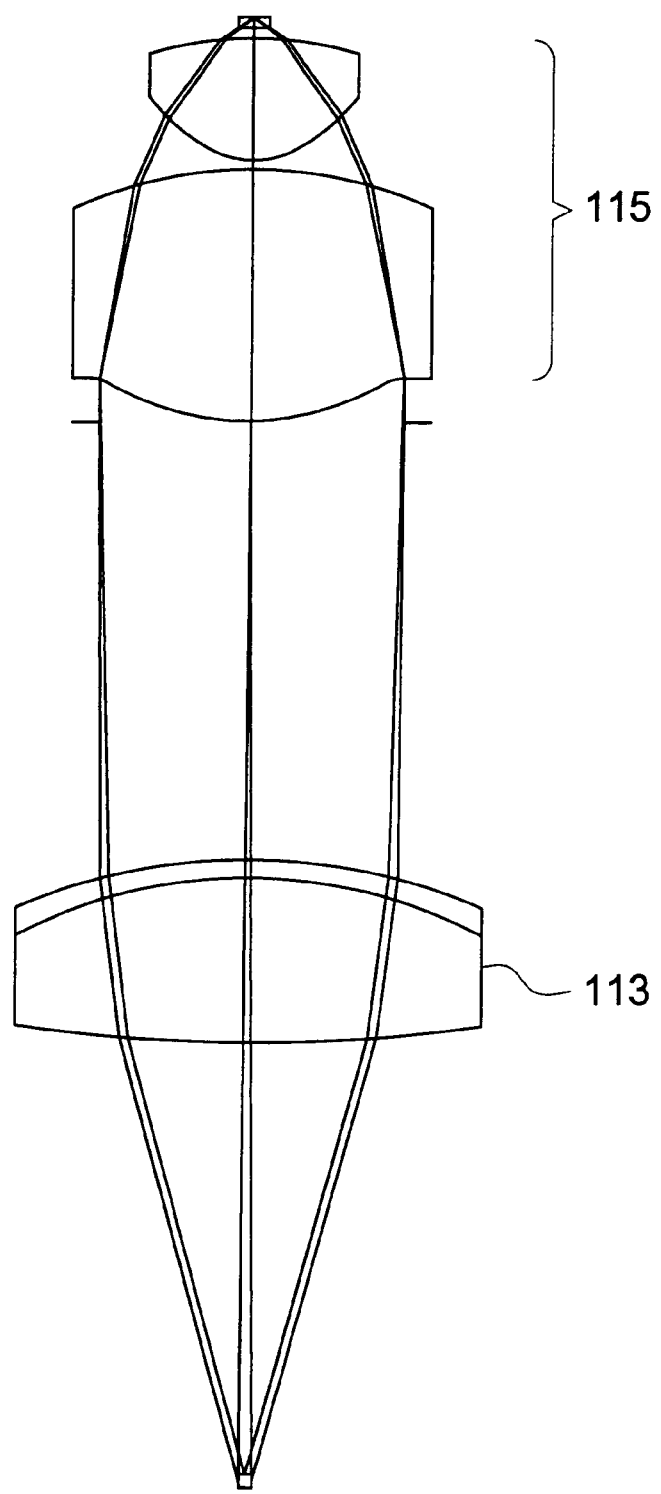
FIG. 11 is an optical path diagram of an optical pickup optical system in Example 3 of the invention.

FIG. 11 shows a diagram of an optical path of an optical pickup optical system in Example 3. FIGS. 9(a) and 9(b) represent graphs wherein FIG. 9(a) shows longitudinal spherical aberration, while, FIG. 9(b) shows astigmatism, both caused for wavelength 400±10 nm on an individual coupling optical system used for an optical pickup optical system in Example 3, and the graph of the longitudinal spherical aberration shows that the focus is shifted to the under side when a wavelength is long. FIG. 10 is a graph showing longitudinal spherical aberration for wavelength of 400±10 nm caused on the total optical pickup optical system in Example 3, and it shows that a back focus is not shifted independently of a wavelength. Incidentally, the objective lens optical system is not illustrated because it is the same as that in FIG. 2.

TABLE 8

| fobj = 1.76 (NA0.85) | fcol = 6.16 (NA0.32) | | mT = −1/3.5 |
|---|---|---|---|
| | $\lambda$ = 400 nm | | |
| i | ri | di | Material |
| 1 | ∞ | 4.99 | |
| 2 | 18.15895 | 2.00 | BK7 |
| 3 | −5.29662 | 0.20 | Olefine resin |
| 4 | −5.29662 | 5.00 | |
| 5 | 2.68348 | 2.80 | FCD1 |
| 6 | −5.25523 | 0.10 | |
| 7 | 1.04469 | 1.40 | FCD1 |
| 8 | −4.64195 | 0.13 | |
| 9 | ∞ | 0.1 | PC |

| Aspherical surface data | | | | |
|---|---|---|---|---|
| 2nd surface | Aspherical surface coefficient | | | |
| | $\kappa$ | 1.1141548E+01 | | |
| | A1 | 1.77738E−03 | P1 | 4.0 |
| | A2 | 1.22626E−04 | P2 | 6.0 |
| | A3 | 4.40569E−05 | P3 | 8.0 |
| | A4 | −4.55156E−06 | P4 | 10.0 |
| 4th surface | Aspherical surface coefficient | | | |
| | $\kappa$ | −8.32090E−01 | | |
| | A1 | 1.49760E−03 | P1 | 4.0 |
| | A2 | 1.53060E−04 | P2 | 6.0 |
| | A3 | 1.96310E−05 | P3 | 8.0 |
| | A4 | 1.28000E−06 | P4 | 10.0 |
| | Optical path difference function | | | |
| | B2 | −1.61970E−02 | | |
| | B4 | −9.06670E−05 | | |
| | B6 | −4.69090E−06 | | |
| | B8 | 5.12830E−07 | | |
| 5th surface | Aspherical surface coefficient | | | |
| | $\kappa$ | −3.23672E−01 | | |
| | A1 | −3.53974E−03 | P1 | 4.0 |
| | A2 | −1.60747E−03 | P2 | 6.0 |
| | A3 | −3.15496E−04 | P3 | 8.0 |
| | A4 | 2.51358E−04 | P4 | 10.0 |
| | A5 | −9.20259E−05 | P5 | 12.0 |
| 6th surface | Aspherical surface coefficient | | | |
| | $\kappa$ | −3.34526E+01 | | |
| | A1 | −2.38927E−02 | P1 | 4.0 |
| | A2 | 2.87803E−03 | P2 | 6.0 |
| | A3 | 5.20366E−03 | P3 | 8.0 |

-continued

Aspherical surface data

| | | | | |
|---|---|---|---|---|
| | A4 −6.92430E−03 | P4 | 10.0 | |
| | A5 2.11693E−03 | P5 | 12.0 | |
| 7th surface | Aspherical surface coefficient | | | |
| | κ −9.30950E−02 | | | |
| | A1 −1.25797E−02 | P1 | 4.0 | |
| | A2 5.52713E−02 | P2 | 6.0 | |
| | A3 −1.84808E−01 | P3 | 8.0 | |
| | A4 2.89972E−01 | P4 | 10.0 | |
| | A5 −2.20549E−01 | P5 | 12.0 | |

Example 4

Table 9 shows data relating to an optical pickup optical system of Example 4. In the Example 4, a two-sided aspherical lens 215 composed of MNBFD82 was used as an objective lens optical system, and collimator 113 made of olefine resin was used as a coupling optical system.

Figure 12:
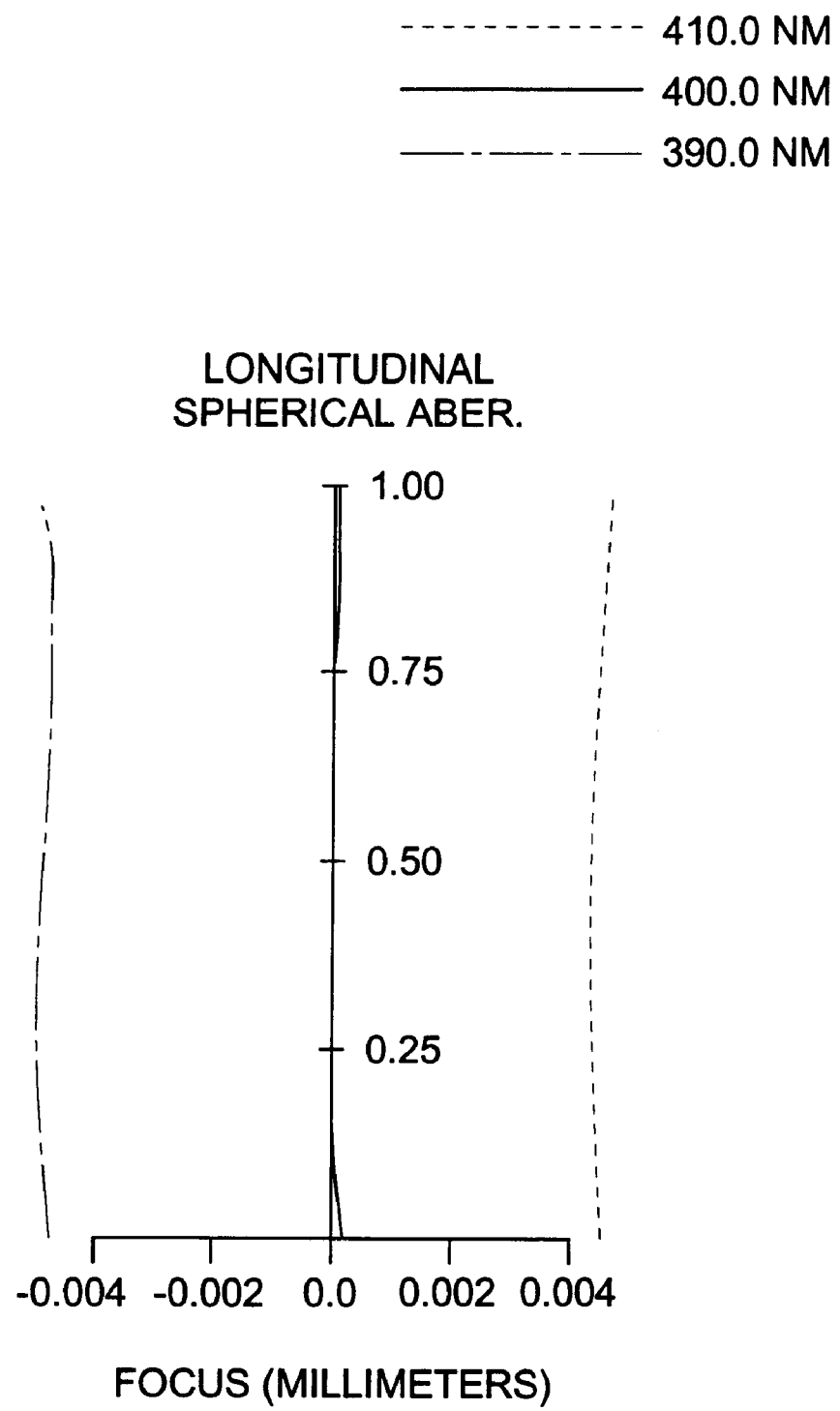
FIG. 12 is a graph showing longitudinal aberration of an objective lens optical system used for an optical pickup optical system in Example 4 of the invention.
Figure 14:
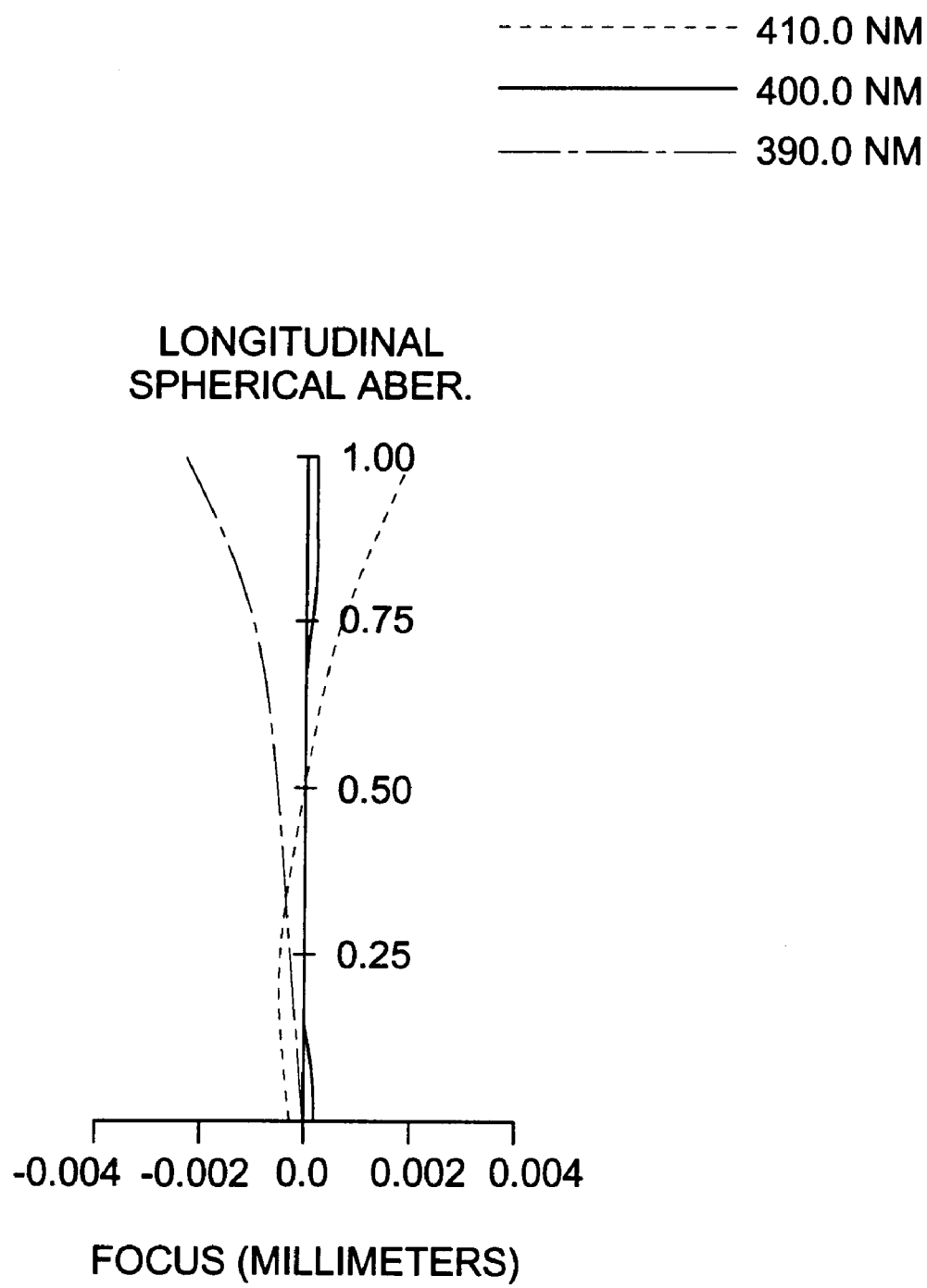
FIG. 14 is a graph showing longitudinal aberration caused on the total optical pickup optical system in Example 4 of the invention.
Figure 15:
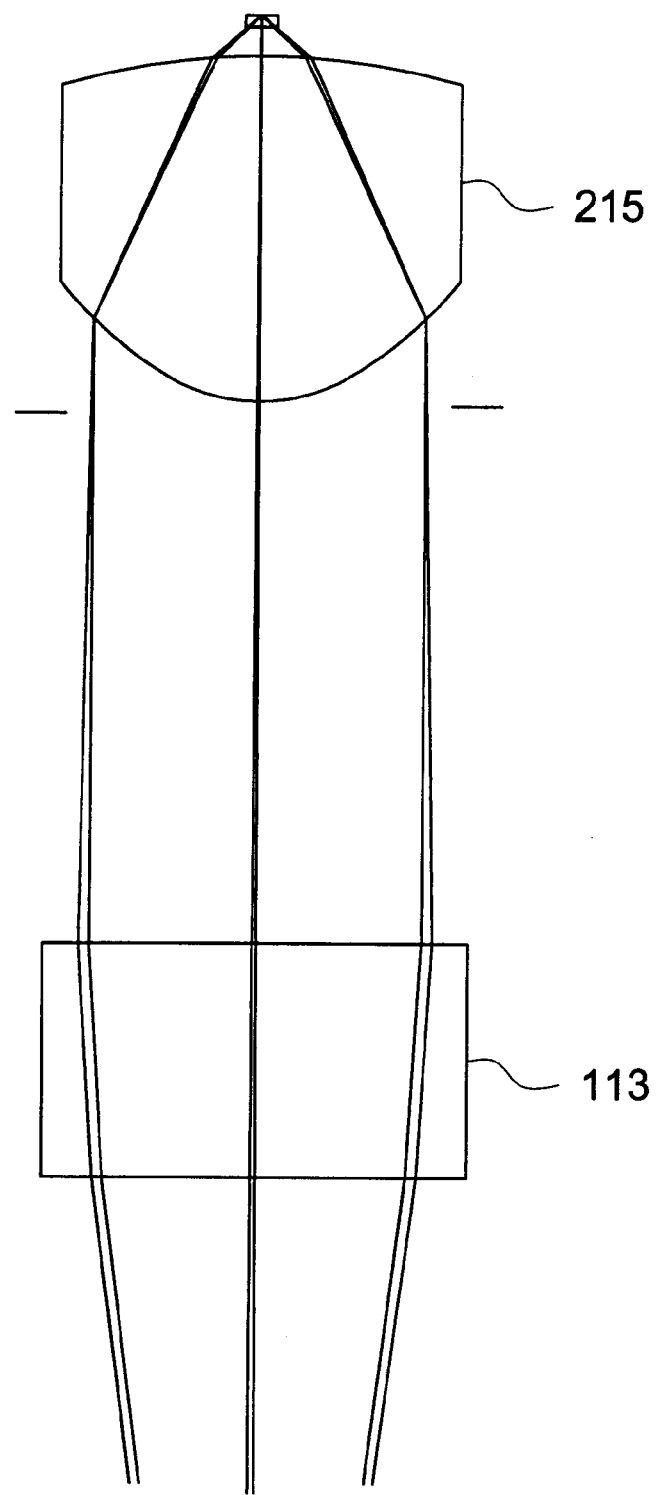
FIG. 15 is an optical path diagram of an optical pickup optical system in Example 4 of the invention.

FIG. 15 shows a diagram of an optical path of an optical pickup optical system in Example 4. FIG. 12 is a graph showing longitudinal spherical aberration for wavelength of 400±10 nm in an individual optical lens optical system used for an optical pickup optical system in Example 4, and it shows that the focus is shifted to the under side when a wavelength is short. FIGS. 13(a) and 13(b) represent graphs wherein FIG. 13(a) shows longitudinal spherical aberration, while, FIG. 13(b) shows astigmatism, both caused for wavelength 400±10 nm on a coupling optical system used for an optical pickup optical system in Example 4, and the graph of the longitudinal spherical aberration shows that the focus is shifted to the under side when a wavelength is long. FIG. 14 is a graph showing longitudinal spherical aberration for wavelength of 400±10 nm caused on the total optical pickup optical system in Example 4, and it shows that a back focus is not shifted independently of a wavelength.

TABLE 9 fobj = 1.76 (NA0.8)   fcol = 6.16 (NA0.32)   mT = −1/3.5
Standard wavelength λ = 400 nm

| i | ri | di | Material |
|---|---|---|---|
| 1 | ∞ | 5.039 | |
| 2 | 18.15895 | 2.000 | Olefine resin |
| 3 | −7.73724 | 5.000 | |
| 4 | 1.72078 | 3.150 | MNBFD82 |
| 5 | −1.92753 | 0.213 | |
| 6 | ∞ | 0.100 | PC |

Aspherical surface data

| | | | | |
|---|---|---|---|---|
| 2nd surface | Aspherical surface coefficient | | | |
| | κ −3.50754E+01 | | | |
| | A1 −2.48733E−04 | P1 | 4.0 | |
| | A2 −4.45053E−05 | P2 | 6.0 | |
| | A3 2.54124E−05 | P3 | 8.0 | |
| | A4 −3.16970E−07 | P4 | 10.0 | |
| 3rd | Aspherical surface | | | |

-continued

Aspherical surface data

| surface | coefficient | | |
|---|---|---|---|
| | κ 6.08100E+00 | | |
| | A1 1.65440E−03 | P1 | 4.0 |
| | A2 −3.38410E−05 | P2 | 6.0 |
| | A3 2.68060E−05 | P3 | 8.0 |
| | A4 1.57990E−06 | P4 | 10.0 |
| | Optical path difference function | | |
| | B2 −3.54620E−02 | | |
| | B4 9.57560E−05 | | |
| | B6 6.77770E−05 | | |
| | B8 −9.39470E−06 | | |
| 4th surface | Aspherical surface coefficient | | |
| | κ −3.19957E−01 | | |
| | A1 −8.97201E−04 | P1 | 4.0 |
| | A2 −1.32966E−03 | P2 | 6.0 |
| | A3 5.67005E−04 | P3 | 8.0 |
| | A4 −4.88314E−04 | P4 | 10.0 |
| | A5 3.37127E−05 | P5 | 12.0 |
| | A6 4.26690E−05 | P6 | 14.0 |
| | A7 −2.00712E−05 | P7 | 16.0 |
| 5th surface | Aspherical surface coefficient | | |
| | κ −1.26718E+02 | | |
| | A1 4.46627E−01 | P1 | 4.0 |
| | A2 −3.74370E+00 | P2 | 6.0 |
| | A3 1.28630E+01 | P3 | 8.0 |
| | A4 −1.76551E+01 | P4 | 10.0 |
| | A5 −2.52229E−04 | P5 | 12.0 |

Example 5

Table 10 shows data relating to an optical pickup optical system of Example 5. In the Example 5, one two-sided aspherical lens 215 composed of MNBFD82 was used as an objective lens optical system in the same way as in Example 4, and collimator 113 which is made of olefine resin and has a diameter of 4 mm was used as a coupling optical system.

Figure 16:
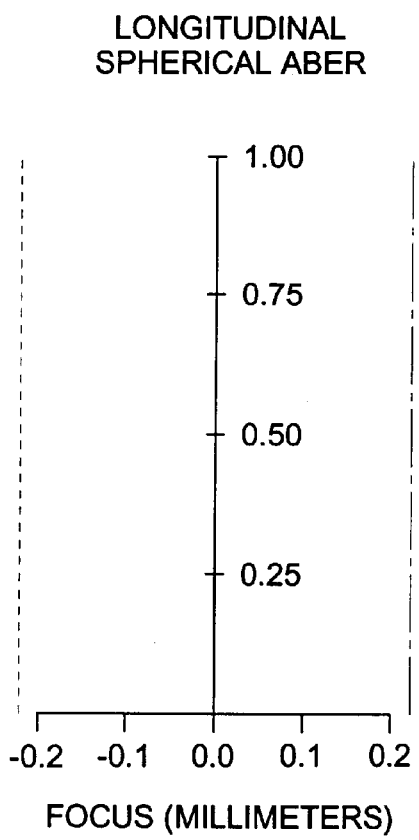
Figure 16:
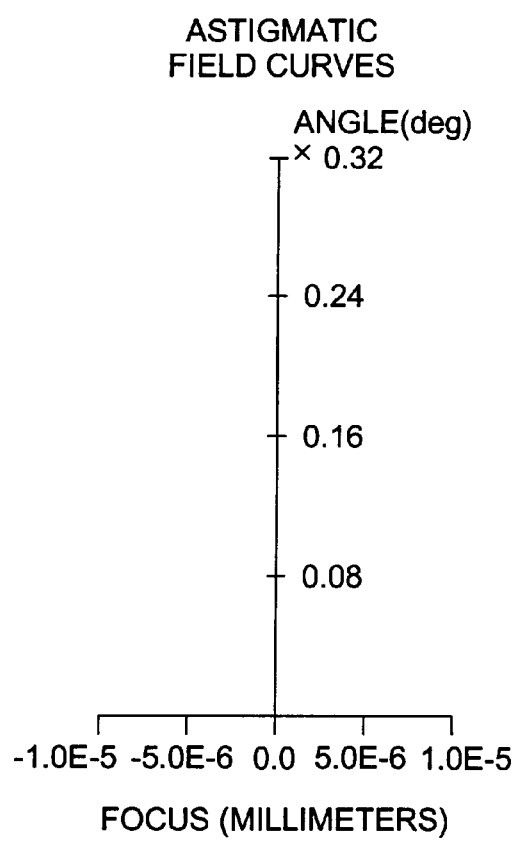
Figure 17:
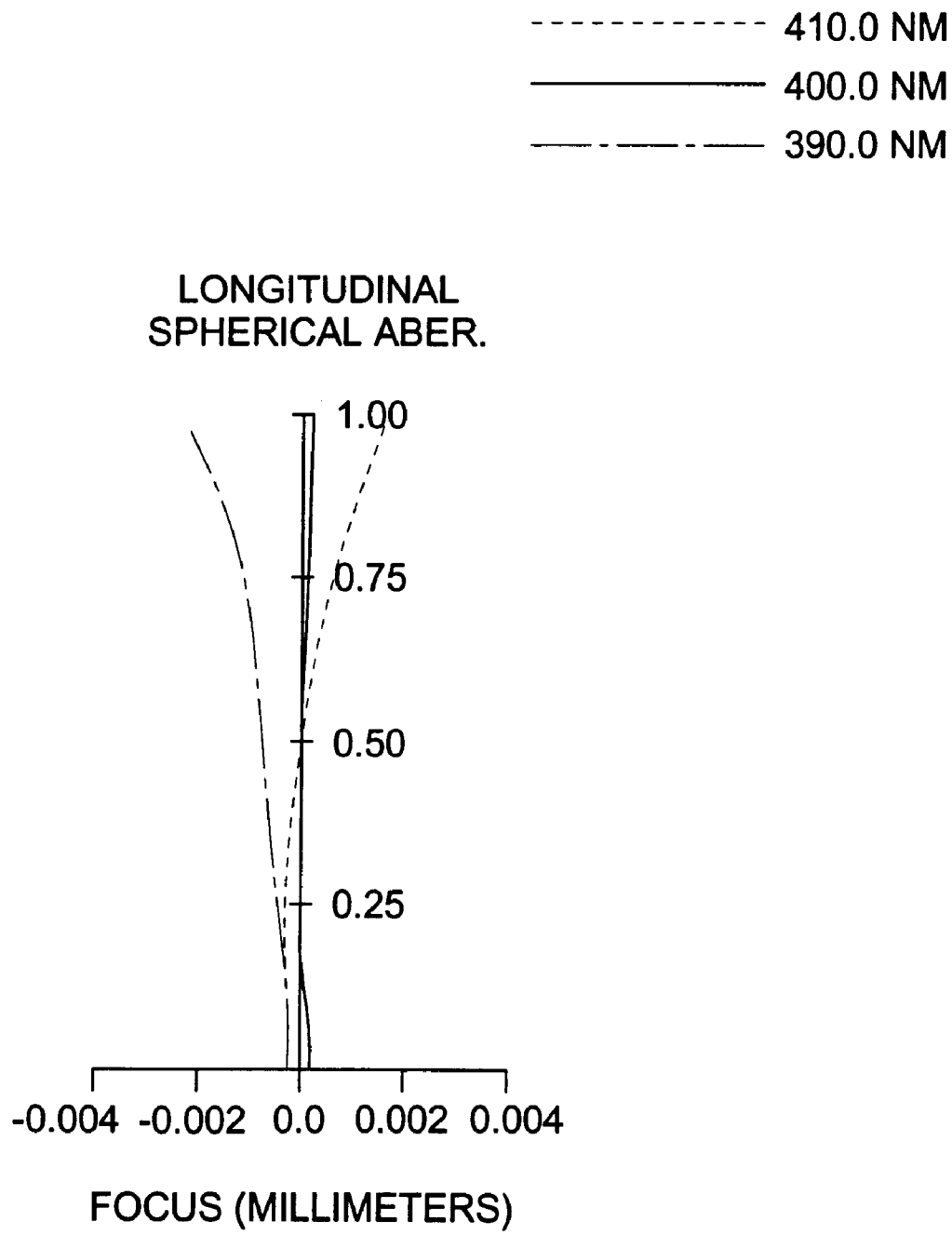
FIG. 17 is a graph showing longitudinal aberration caused on the total optical pickup optical system in Example 5 of the invention.
Figure 18:
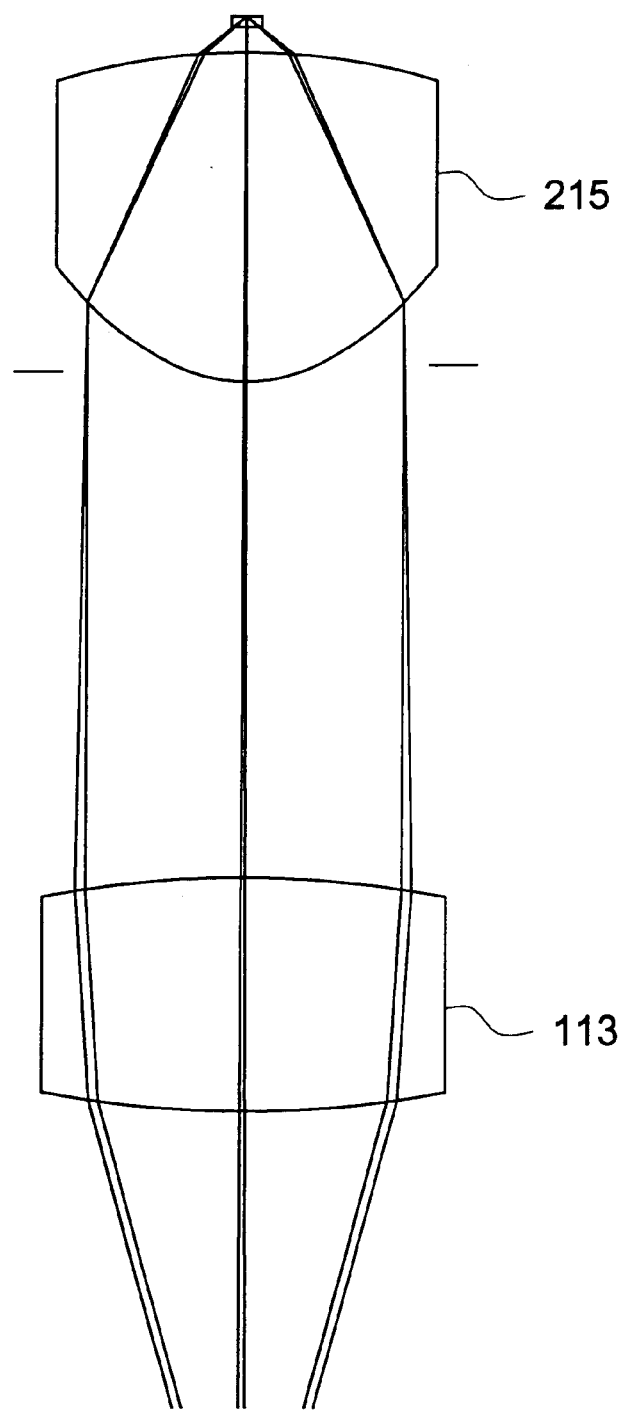
FIG. 18 is an optical path diagram of an optical pickup optical system in Example 5 of the invention.

FIG. 18 shows a diagram of an optical path of an optical pickup optical system in Example 5. FIGS. 16(a) and 16(b) represent graphs wherein FIG. 16(a) shows longitudinal spherical aberration, while, FIG. 16(b) shows astigmatism, both caused for wavelength 400±10 nm on an individual coupling optical system used for an optical pickup optical system in Example 5, and the graph of the longitudinal spherical aberration shows that the focus is shifted to the under side when a wavelength is long. FIG. 17 is a graph showing longitudinal spherical aberration for wavelength of 400±10 nm caused on the total optical pickup optical system in Example 5, and it shows that a back focus is not shifted independently of a wavelength. Incidentally, the objective lens optical system is not illustrated because it is the same as that in FIG. 12.

TABLE 10 fobj = 1.76 (NA0.8)   fcol = 12.32 (NA0.16)   mT = −1/7
Standard wavelength λ = 400 nm

| i | ri | di | Material |
|---|---|---|---|
| 1 | ∞ | 11.0985 | |
| 2 | 84.41371 | 2.000 | Olefine resin |
| 3 | −38.42175 | 5.000 | |

TABLE 10-continued

| fobj = 1.76 (NA0.8) | fcol = 12.32 (NA0.16) | mT = −1/7 |  |
|---|---|---|---|
| Standard wavelength λ = 400 nm | | | |
| i | ri | di | Material |
| 4 | 1.72078 | 3.150 | MNBFD82 |
| 5 | −1.92753 | 0.213 | |
| 6 | ∞ | 0.100 | PC |

| Aspherical surface data | | | | |
|---|---|---|---|---|
| 2nd surface | Aspherical surface coefficient | | | |
| | κ | 7.30266224E+02 | | |
| | A1 | 1.06001E−03 | P1 | 4.0 |
| | A2 | 1.28739E−04 | P2 | 6.0 |
| | A3 | 1.02206E−05 | P3 | 8.0 |
| | A4 | 1.81273E−06 | P4 | 10.0 |
| 3rd surface | Aspherical surface coefficient | | | |
| | κ | −1.33980E+01 | | |
| | A1 | 9.89550E−04 | P1 | 4.0 |
| | A2 | 8.38580E−05 | P2 | 6.0 |
| | A3 | 1.42940E−05 | P3 | 8.0 |
| | A4 | 2.32520E−06 | P4 | 10.0 |
| | Optical path difference function | | | |
| | B2 | −3.09620E−02 | | |
| | B4 | −7.38770E−05 | | |
| | B6 | 8.36570E−06 | | |
| | B8 | −7.62360E−06 | | |
| 4th surface | Aspherical surface coefficient | | | |
| | κ | −3.19957E−01 | | |
| | A1 | −8.97201E−04 | P1 | 4.0 |
| | A2 | −1.32966E−03 | P2 | 6.0 |
| | A3 | 5.67005E−04 | P3 | 8.0 |
| | A4 | −4.88314E−04 | P4 | 10.0 |
| | A5 | 3.37127E−05 | P5 | 12.0 |
| | A6 | 4.26690E−05 | P6 | 14.0 |
| | A7 | −2.00712E−05 | P7 | 16.0 |
| 5th surface | Aspherical surface coefficient | | | |
| | κ | −1.26718E+02 | | |
| | A1 | 4.46627E−01 | P1 | 4.0 |
| | A2 | −3.74370E+00 | P2 | 6.0 |
| | A3 | 1.28630E+01 | P3 | 8.0 |
| | A4 | −1.76551E+01 | P4 | 10.0 |
| | A5 | −2.52229E−04 | P5 | 12.0 |

As explained above, the invention makes it possible to obtain an optical pickup optical system which can be manufactured at low cost and can be corrected in terms of longitudinal spherical aberration by a relatively simple structure even when a light source with poor monochromaticity or a light source wherein a wavelength varies quickly is used, an optical pickup apparatus equipped with the optical pickup optical system stated above, and a recording/reproducing apparatus equipped with the optical pickup optical system stated above. Further, the invention makes it possible to obtain a coupling optical system and a coupling optical system lens wherein longitudinal spherical aberration can be corrected because of a large numerical aperture on the part of an optical information recording medium, when they are used together with an objective lens wherein longitudinal spherical aberration remains, for the purposes of correction of spherical aberration, correction of sine conditions, making to be small, making to be thin, making to be light and making to be low cost.

Figure 19:
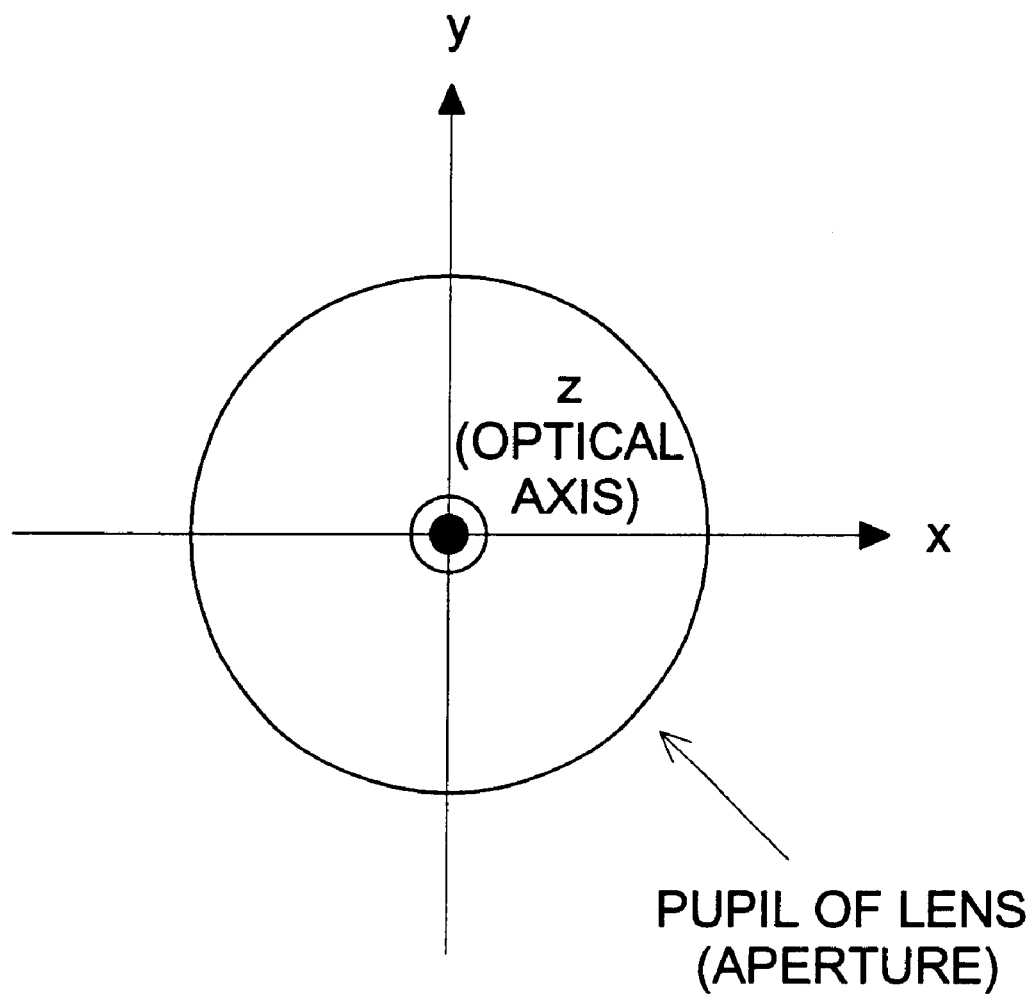
FIG. 19 is a diagram showing a coordinate system relating to an optical path difference function of a diffraction surface of a collimator.

Furthermore, another preferable embodiment of the invention will be explained as follows, referring FIGS. 19 ? 21. Each lens constituting the optical pickup optical system in the present embodiment has, on at least one of its optical surfaces, a shape of aspherical surface expressed by the following Expression D wherein Z represents an axis in the direction of an optical axis, h represents an axis in the direction perpendicular to an optical axis, the direction of an advance of light is assumed to be positive, R0 represents a paraxial radius of curvature, ? represents the constant of the cone, Ai represents the constant of the aspheric surface, and Pi represents an exponent of the aspheric surface.

$$Z = \frac{h^2/R_0}{1 + \sqrt{1-(1+\kappa)(h/R_0)^2}} + \sum_{i=1}^{\infty} A_i h^{P_i} \qquad \text{Expression (D)}$$

The diffraction surface includes one expressed by a polynomial whose form is rotation-symmetrical about an optical axis, and one expressed by a polynomial for two axes (X, Y) which are perpendicular to an optical axis and cross at right angles.

The diffraction surface expressed by the polynomial that is rotation-symmetrical about an optical axis is expressed by Expression 12 representing an optical path difference function, and the diffraction surface expressed by the polynomial of axes (X, Y) perpendicular to an optical axis is expressed by Expression 13 representing an optical path difference function, both in a unit of mm. In the foregoing, X, Y and Z represent an orthogonal coordinate system of a right hand system, and design wavelength of an optical path difference function is 780 nm. The coordinate system of this type is shown in FIG. 19.

$$\Phi_B = \sum_{i=1}^{\infty} B_i h^{Q_i} \qquad \text{Expression (E)}$$

$$\Phi_C = \sum_{i=1}^{\infty} C_i x^{M_i} y^{N_i} \qquad \text{Expression (F)}$$

Example 6

Table 11 shows data relating to a light-converging optical system for an optical pickup apparatus composed of an objective lens and a coupling lens optical system in Example 6. Incidentally, in the lens data which will be shown from now on, power multiplier of 10 (for example, 2.5×10−3) is expressed by the use of E (for example, 2.5×E−3). Further, primary light caused by diffraction of a diffraction pattern expressed by the rotation-symmetrical polynomial means light wherein an angle of ray of light is changed in the direction of convergence after diffraction.

TABLE 11

Example 6

| Wavelength (nm) | | | 650 | 780 |
|---|---|---|---|---|
| Diffraction degree (collimator) | | | 1 | 1 |
| Focal length (collimator) (mm) | | | 23.00 | 23.00 |
| Focal length (objective lens) (mm) | | | 3.36 | 3.39 |
| Necessary numerical aperture (objective lens) | | | 0.60 | 0.45 |

| i | ri (mm) | d1i (mm) | d2i (mm) | Material |
|---|---|---|---|---|
| 1 | ∞ | 21.97 | 21.97 | |
| 2 | 161.3444 | 1.70 | 1.70 | Olefine resin 1 |
| 3 | −13.6486 | 5.00 | 5.00 | |
| 4 | 2.1140 | 2.20 | 2.20 | Olefine resin 2 |
| 5 | −7.9630 | 1.76 | 1.40 | |
| 6 | ∞ | 0.60 | 1.20 | PC |

Aspherical surface data

3rd surface — Aspherical surface coefficient

κ  −1.0016E+00
A1 −1.4469E−05  P1  4

Optical path difference function

B1 −9.3281E−04  Q1  2
B2 −8.2376E−07  Q2  4

4th surface $1^{st}$ ring zone ($0 \leq h < 1.279$)    $3^{rd}$ ring zone ($1.532 \leq h$)

Aspherical surface coefficient

κ  −9.7700E−01
A1  6.3761E−04  P1  3
A2  3.6688E−04  P2  4
A3  8.3511E−03  P3  5
A4 −3.7296E−03  P4  6
A5  4.6548E−04  P5  8
A6 −4.3124E−05  P6  10

$2^{nd}$ ring zone ($1.279 \leq h < 1.532$)

d'  2.1995

Aspherical surface coefficient

κ  −1.1481E+00
A1  7.0764E−03  p1  3
A2 −1.3388E−02  p2  4
A3  2.4084E−02  p3  5
A4 −9.7636E−03  p4  6
A5  9.3136E−04  p5  8
A6 −6.8008E−05  p6  10

5th surface — Aspherical surface coefficient

κ  −2.4914E+01
A1  1.3775E−03  P1  3
A2 −4.1269E−03  P2  4
A3  2.1236E−02  P3  5
A4 −1.3895E−02  P4  6
A5  1.6631E−03  P5  8
A6 −1.2138E−04  P6  10

An objective lens is a specific objective lens wherein the surface closer to the collimator is composed of plural ring-zonal surfaces (first, second and third ring zones) divided in a shape of concentric circles, and with regard to each ring zone, the first and third ring zones are corrected in terms of aberration within a diffraction limit for short wavelength and thin base board, utilizing each spherical aberration, for plural light sources each having a different wavelength and transparent base boards each having a different thickness, and the second ring zone is corrected in terms of aberration within a diffraction limit for thick base boards in long wavelength. The symbol d' of the second ring zone shows a distance on the optical axis from an intersecting point between an optical axis and the second ring zone extended in accordance with the expression for an aspherical surface shape to the surface of the objective lens closer to the transparent base board. This objective lens is designed so that its power may be maintained properly when parallel rays enter the objective lens through its surface closer to the light source.

A HOE collimator made of olefine resin is used as a coupling lens. On the surface of the collimator closer to the objective lens, there is provided a serrated diffraction pattern to be almost in a shape of concentric circles centered on an optical axis. Table 12 shows refractive indexes of the members stated above.

TABLE 12

| | Refractive index | |
|---|---|---|
| Wavelength | 650 nm | 780 nm |
| Olefine resin 1 | 1.5295 | 1.5255 |
| Olefine resin 2 | 1.5377 | 1.5337 |
| PC | 1.58 | 1.57 |

Figure 20:
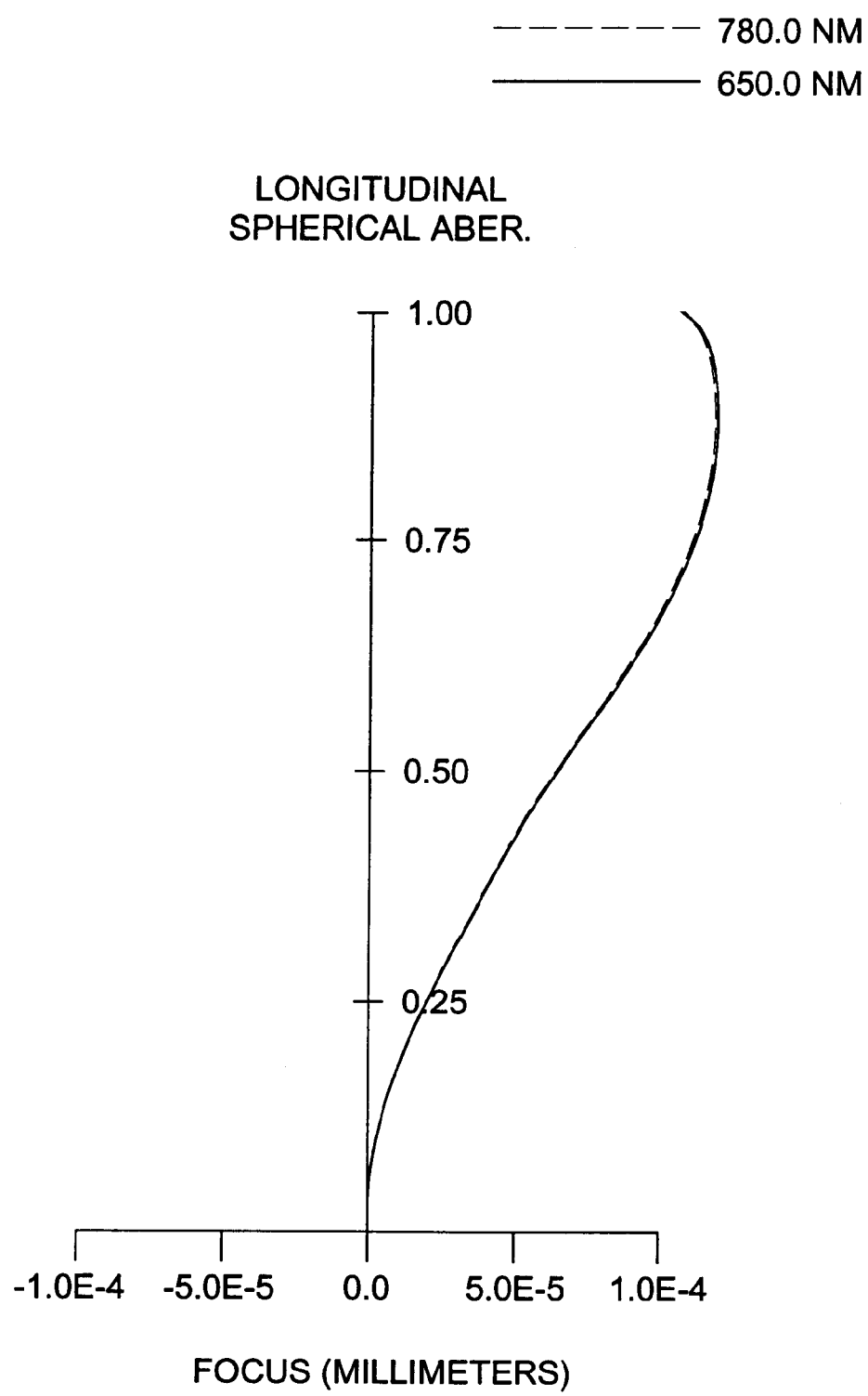
FIG. 20 is a graph showing chromatic aberration of an individual collimator in Example 6.

FIG. 20 is a graph showing chromatic aberration of an individual collimator in Example 6. FIG. 20 shows that a back focus is not shifted independently of a wavelength. In the case of an optical pickup apparatus employing a unit (for example, a two-laser package) wherein two light sources each having a different wavelength are packed to be one package, when positions of light sources each having a different wavelength in the direction of an optical axis are the same, if a collimator having longitudinal spherical aberration is used, light emitted from at least one light source does not form a collimated light after emerging from the collimator, resulting in worsened performance of the total optical pickup optical system. However, when the collimator of the present Example is used, collimated light emerges from the collimator for both wavelengths each being different from the other, thus, performance of the total optical pickup optical system remains to be satisfactory.

Example 7

When using plural light sources each having a different wavelength without using an optical element such as a beam splitter, at least one light source needs to be installed to be away from an optical axis. When a conventional collimator is used, a ray of light emerging from an off-axis portion on the collimator is tilted from an optical axis after emerging from the collimator, and then, is subjected to occurrence of coma when it passes through an objective lens and a transparent base board, resulting in deterioration of performance of the total light-converging optical system. Table 13 shows data relating to the collimator in Example 7. A diffraction grating is provided on the surface of the collimator closer to a light source. When the collimator of the present Example is used in the optical pickup optical system wherein a light source having a wavelength of 650 nm is installed on an optical axis and a light source having a wavelength of 780 nm is installed to be away from the optical axis by 0.1 mm, light emitted from whichever light source is changed, after emerging from the collimator, to light that is in parallel with an optical axis, when 0-order light is used for light emitted from a light source with a wavelength of 650 nm and primary light is used for a light source with a wavelength of 780 nm.

TABLE 13

Example 7

| Wavelength (nm) | | 650 | 780 | |
|---|---|---|---|---|
| Diffraction degree (collimator) | | 0 | 1 | |
| Focal length (mm) | | 23.00 | 23.18 | |
| i | ri (mm) | d1i (mm) | d2i (mm) | Material |
| 1 | ∞ | 21.89 | 22.06 | |
| 2 | ∞ | 1.7 | 1.7 | Olefine resin 1 |
| 3 | −12.1785 | | | |

Aspherical surface data
2nd surface
Diffraction grating
    Grating pitch (nm)    0.172
3rd surface Aspherical surface coefficient

| | | | |
|---|---|---|---|
| κ | −9.53089E−01 | | |
| A1 | −2.54425E−05 | P1 | 4 |
| A2 | −1.60249E−07 | P2 | 6 |
| A3 | 2.10488E−08 | P3 | 8 |
| A4 | −1.21174E−09 | P4 | 10 |

Example 8

Table 14 shows data relating to the collimator in Example 8. A diffraction pattern expressed by polynomial of (X, Y) is provided on the surface of the collimator closer to a light source. In the same way as in Example 7, it is possible to make light emitted from whichever light source to emerge as light being in parallel with an optical axis, by using 0-order light for a light source with a wavelength of 650 nm and by using primary light for a light source with a wavelength of 780 nm that is located to be away from an optical axis by 0.1 mm. When parallel rays of light having a wavelength of 780 nm are made to enter through the surface of the collimator farther from the light source to calculate wavefront aberration, there is generated coma with 0.010 λ in terms of a standard deviation value on the collimator provided with a diffraction grating in Example 7. However, in the collimator in Example 8, coma is corrected to 0.000 λ in the collimator of Example 8 wherein a diffraction pattern expressed by polynomial of (X, Y) is used in place of a diffraction grating.

TABLE 14

Example 8

| Wavelength (nm) | | 650 | 780 | |
|---|---|---|---|---|
| Diffraction degree (collimator) | | 0 | 1 | |
| Focal length (mm) | | 23.00 | 23.18 | |
| i | ri (mm) | d1i (mm) | d2i (mm) | Material |
| 1 | ∞ | 21.89 | 22.06 | |
| 2 | ∞ | 1.7 | 1.7 | Olefine resin 1 |
| 3 | −12.1785 | | | |

Aspherical surface data

2nd surface  Optical path difference function

| | | | | | |
|---|---|---|---|---|---|
| | C1 | 4.53290E−03 | M1 | 0 | N1 | 1 |
| | C2 | −4.60740E−06 | M2 | 2 | N2 | 1 |
| | C3 | −4.60750E−06 | M3 | 0 | N3 | 3 |

3rd surface Aspherical surface coefficient

| | | | |
|---|---|---|---|
| κ | −9.53089E−01 | | |
| A1 | −2.54425E−05 | P1 | 4 |
| A2 | −1.60249E−07 | P2 | 6 |
| A3 | 2.10488E−08 | P3 | 8 |
| A4 | −1.21174E−09 | P4 | 10 |

Example 9

Table 15 shows data relating to a collimator in Example 9. A diffraction pattern expressed by polynomial of (X, Y) is provided on the surface of the collimator closer to a light source, and a diffraction pattern expressed by the polynomial that is rotation-symmetrical about an optical axis is provided on the opposite surface. By using the primary diffraction light caused by the diffraction pattern provided on the surface farther from the light source, it is possible to obtain light that is in parallel with an optical axis after emergence from the collimator, even when a position of a light source with a wavelength of 650 nm is the same as that of a light source with a wavelength of 780 nm. The primary diffraction light caused by the diffraction pattern provided on the surface closer to the light source has a function to convert a principal ray of a light flux emitted from the light source with a wavelength of 780 nm located to be away from an optical axis by 0.1 mm into a ray of light that is in parallel with an optical axis. Therefore, when the collimator of the present Example is used for an optical pickup optical system together with a light source unit wherein a light source with a wavelength of 650 nm and a light source with a wavelength of 780 nm are arranged in parallel to be away from ach other by 0.1 mm to be a two-laser package, light emitted from whichever light source is changed, after emerging from the collimator, to light that is in parallel with an optical axis.

TABLE 15

Example 9

| Wavelength (nm) | 650 | 780 |
|---|---|---|
| Diffraction degree (collimator) | 0 | 1 |
| Focal length (mm) | 23.00 | 23.00 |

| i | ri (mm) | d1i (mm) | d2i (mm) | Material |
|---|---|---|---|---|
| 1 | ∞ | 21.89 | 21.89 | |
| 2 | ∞ | 1.7 | 1.7 | Olefine resin 1 |
| 3 | −12.1785 | | | |

Aspherical surface data

| 2nd surface | Optical path difference function | | | | |
|---|---|---|---|---|---|
| | C1 | 4.53290E-03 | M1 | 0 | N1 1 |
| | C2 | −4.60740E-06 | M2 | 2 | N2 1 |
| | C3 | −4.60750E-06 | M3 | 0 | N3 3 |
| 3rd surface | Aspherical surface coefficient | | | | |
| | κ | −9.53089E-01 | | | |
| | A1 | −2.54425E-05 | P1 | 4 | |
| | A2 | −1.60249E-07 | P2 | 6 | |
| | A3 | 2.10488E-08 | P3 | 8 | |
| | A4 | −1.21174E-09 | P4 | 10 | |
| | Optical path difference function | | | | |
| | B1 | −1.6107E-04 | Q1 | 2 | |
| | B2 | −3.6851E-07 | Q2 | 4 | |
| | B3 | 6.9121E-08 | Q3 | 6 | |

Example 10

Table 16 shows data relating to an optical pickup optical system in Example 10. When a conventional collimator is used, a ray of light emitted from an off-axis light source becomes a ray of light tilted from an optical axis after emerging from the collimator, and generates coma after passing through an objective lens and a transparent base board, to deteriorate performance of the total light-converging optical system. In the case of the collimator in the present Example, the collimator is provided with off-axis characteristics which correct coma generated in an objective lens and a transparent base board when an off-axis light source is used. In the optical pickup optical system wherein a light source with a wavelength of 780 nm is arranged to be away from an optical axis by 0.1 mm, when calculating wavefront aberration of the total optical system by establishing the aperture restriction which makes NA on the part of the transparent base board to be 0.45, coma is corrected to be 0.001 λ or less in terms of standard deviation value.

TABLE 16

Example 10

| Wavelength (nm) | 650 | 780 |
|---|---|---|
| Focal length (collimator) (mm) | 23.00 | 23.20 |
| Focal length (objective lens) (mm) | 3.36 | 3.39 |
| Necessary numerical aperture (objective lens) | 0.60 | 0.45 |

| i | ri (mm) | d1i (mm) | d2i (mm) | Material |
|---|---|---|---|---|
| 1 | ∞ | 25.24 | 25.45 | |
| 2 | 6.00449 | 2.80 | 2.80 | Olefine resin 1 |
| 3 | 9.93359 | 5.00 | 5.00 | |
| 4 | 2.1140 | 2.20 | 2.20 | Olefine resin 2 |
| 5 | −7.9630 | 1.76 | 1.40 | |
| 6 | ∞ | 0.60 | 1.20 | PC |

Aspherical surface data

| 1st surface | Aspherical surface coefficient | | |
|---|---|---|---|
| | κ | 1.26242E+00 | |
| | A1 1.14868E-04 | P1 | 4 |
| | A2 9.41863E-05 | P2 | 6 |
| | A3 −5.20155E-06 | P3 | 8 |
| | A4 −2.82765E-08 | P4 | 10 |
| 2nd surface | Aspherical surface coefficient | | |
| | κ | 6.10689E+00 | |
| | A1 1.16813E-03 | P1 | 4 |
| | A2 2.77707E-04 | P2 | 6 |
| | A3 −1.17626E-05 | P3 | 8 |
| | A4 1.27423E-06 | P4 | 10 |

4th surface

1st ring zone (0 ≤ h < 1.279)    3rd ring zone (1.532 ≤ h)

| Aspherical surface coefficient | | |
|---|---|---|
| κ −9.7700E-01 | | |
| A1 6.3761E-04 | P1 | 3 |
| A2 3.6688E-04 | P2 | 4 |
| A3 8.3511E-03 | P3 | 5 |
| A4 −3.7296E-03 | P4 | 6 |
| A5 4.6548E-04 | P5 | 8 |
| A6 −4.3124E-05 | P6 | 10 |

2nd ring zone (1.279 ≤ h < 1.532)

d′ 2.1995

| Aspherical surface coefficient | | |
|---|---|---|
| κ −1.1481E+00 | | |
| A1 7.0764E-03 | P1 | 3 |
| A2 −1.3388E-02 | P2 | 4 |
| A3 2.4084E-02 | P3 | 5 |
| A4 −9.7636E-03 | P4 | 6 |
| A5 9.3136E-04 | P5 | 8 |
| A6 −6.8008E-05 | P6 | 10 |

| 5th surface | Aspherical surface coefficient |
|---|---|
| | κ −2.4914E+01 |
| | A1 1.3775E-03 |
| | A2 −4.1269E-03 |
| | A3 2.1236E-02 |
| | A4 −1.3895E-02 |
| | A5 1.6631E-03 |
| | A6 −1.2138E-04 |

Incidentally, the collimator may also be in an arrangement wherein a diffraction pattern is provided only on one surface, chromatic aberration is corrected by diffraction effect of the diffraction pattern, and/or a principal ray of a light flux incident obliquely from an optical axis of the light-converging optical system is made to emerge in the direction that is almost in parallel with the optical axis, or, a diffraction pattern is provided on two surfaces of the collimator, chromatic aberration is corrected by diffraction effect of the diffraction patterns on both surfaces stated above, and/or a principal ray of a light flux incident obliquely from an optical axis of the light-converging optical system is made to emerge in the direction that is almost in parallel with the optical axis, or further, a diffraction pattern is provided on two surfaces of the collimator, chromatic aberration is corrected by diffraction effect of the diffraction pattern on the surface on one side, and a principal ray of a light flux incident obliquely from an optical axis of the light-converging optical system is made, by diffraction effect of the diffraction pattern on the surface on the other side, to enter in the direction that is almost in parallel with the optical axis.

Figure 21:
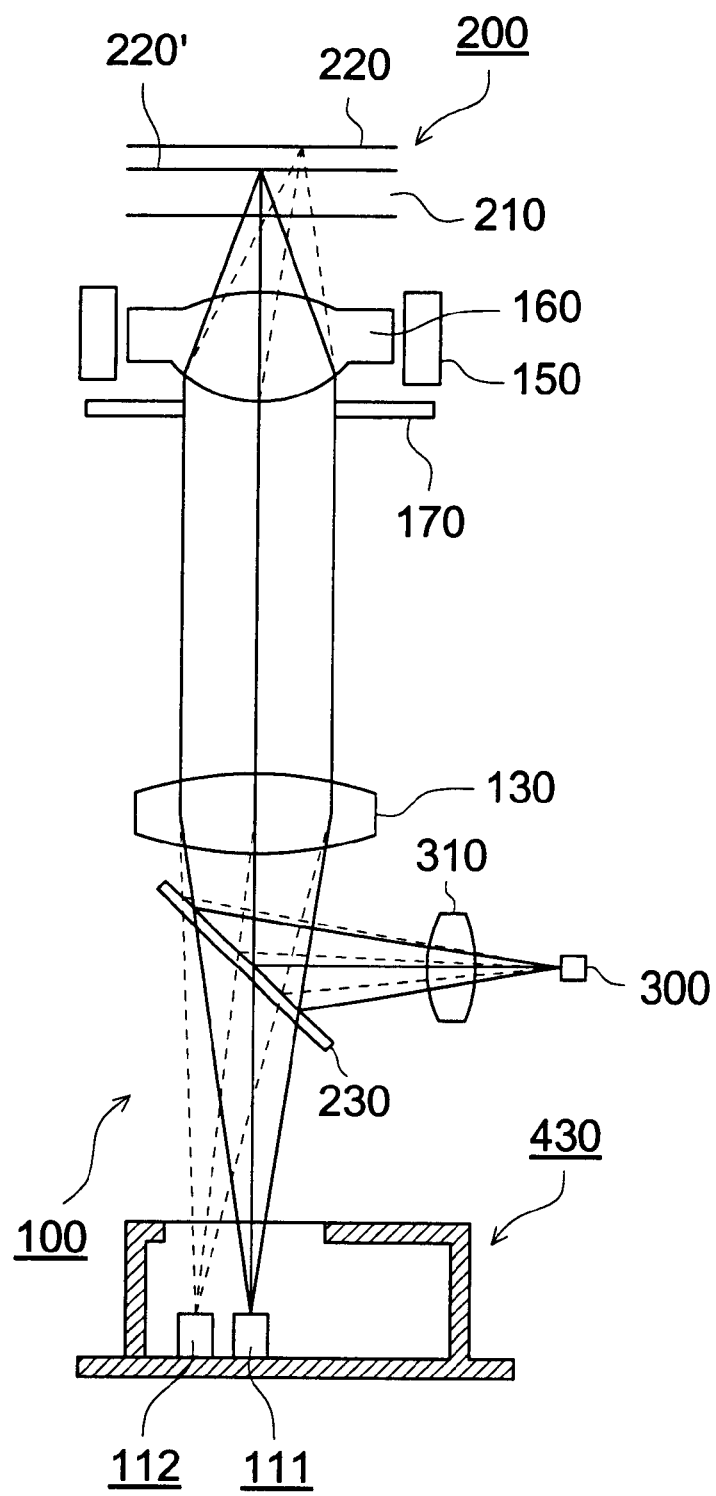
FIG. 21 is a schematic diagram showing an optical pickup apparatus in the present embodiment.

FIG. 21 is a schematic diagram showing an optical pickup apparatus in the present embodiment. In the optical pickup apparatus 100 shown in FIG. 21, first semiconductor laser 111 and second semiconductor laser 112 both representing a 2-laser package are fixed in parallel to be unitized. The Examples 6–10 stated above can be used for collimator 130.

When reproducing the first optical disk (for example, DVD), a light flux (wavelength of 635 or 650 nm) emitted from the first semiconductor laser 111 representing a light source arranged on optical axes of collimator (coupling lens) 130 and objective lens 160 both constituting a light-converging optical system is transmitted through beam splitter 230 and collimator 130 to be a collimated light flux. The collimated light flux is further stopped down by diaphragm 170 to be converged, by objective lens 160, on information recording surface 220 through transparent base board 210 of first optical disk 200.

Then, the light flux modulated by information pit and reflected on the information recording surface 220 is transmitted through collimator 130 again through objective lens 160 and diaphragm 170, and is reflected on beam splitter 230 to enter optical detector 300 through sensor lens 310, thereby, signals outputted from the optical detector 300 are used to obtain signals for reading information recorded on the first optical disk 200.

Further, it is possible to move objective lens 160 by means of two-dimensional actuator 150 for focusing and tracking, by detecting a change in quantity of light caused by a change in form and a change in position of a spot on the optical detector 300, and thereby, by conducting focusing detection and track detection.

The first semiconductor laser 111 and the second semiconductor laser 112 both representing a 2-laser package are fixed in parallel to be unitized, which makes it possible to correct chromatic aberration, even when two light sources are fixed in terms of position to be unable to move separately in the direction parallel to an optical axis of a light-converging optical system.

When reproducing the second optical disk (for example, CD), a light flux (wavelength of 780 nm) emitted from the second semiconductor laser 112 representing a light source arranged to be out of an axis of a light-converging optical system enters obliquely to be almost in parallel with an optical axis of collimator 130, and is further transmitted through the collimator 130 to become a light flux that is mostly collimated. It further passes through diaphragm 170 and objective lens 160 to be converged on information recording surface 220' through transparent base board 210 of second optical disk 200.

Then, the light flux modulated by information pit and reflected on the information recording surface 220' is transmitted through collimator 130 again through objective lens 160 and diaphragm 170, and is reflected on beam splitter 230 to enter optical detector 300, thereby, outputted signals are used to obtain signals for reading information recorded on the second optical disk 200.

Further, by detecting a change in quantity of light caused by a change in form and a change in position of a spot on the optical detector 300, and thereby, by conducting focusing detection and track detection. it is possible to move objective lens 160, based on the detection mentioned above, by means of two-dimensional actuator 150 for focusing and tracking.

As the present embodiment shows, by arranging the first semiconductor laser 111 on an optical axis of a light-converging optical system, a laser beam for DVD to converge more accurately for information recording is caused to advance in the direction parallel to the optical axis so that the best optical characteristics of the light-converging optical system may be displayed. On the other hand, a laser beam for CD which is less required than DVD to converge accurately for information recording is caused to enter from the second semiconductor laser 112 obliquely from an optical axis of collimator 130 to be converted into collimated light thereafter. Incidentally, when the laser beam emitted from the second semiconductor laser 112 is caused to enter, from a portion out of an axis of collimator 130, obliquely from the optical axis, if the laser beam which is emitted from the second semiconductor laser 112 and has passed the collimator 130 is caused to have coma so that coma generated when passing through objective lens 160 may be canceled, it is possible to correct coma of the total light-converging optical system satisfactorily.

The present invention makes it possible to provide a coupling lens for an optical pickup apparatus and an optical pickup apparatus which are capable of doing information recording/reproducing satisfactorily, even when a laser light source unit such as, for example, a 2-laser package is used.

Disclosed embodiment can be varied by a skilled person without departing from the spirit and scope of the invention.

What is claimed is:

1. An optical pickup apparatus for recording information to an optical information recording medium or for reproducing information from the optical information recording medium, the optical pickup apparatus comprising:
    (a) a light source for emitting light flux;
    (b) a light-converging optical system for converging the light flux emitted from the light source, the light-converging optical system having,
        (1) a coupling optical system for converting a divergent angle of the light flux emitted from the light source, and
        (2) an objective lens optical system for converging light flux emitted from the coupling optical system onto an information recording surface of the optical information recording medium; and
    (c) an light detector for detecting a light reflected from or transmitted through the information recording surface of the optical information recording medium,
    wherein at least one surface of the coupling optical system is provided with a diffraction surface by which a longitudinal spherical aberration is made to be smaller when light having a wavelength different from that of light having a predetermined wavelength by a prescribed difference of wavelength enters the objective lens optical system through the coupling optical system, compared with a longitudinal spherical aberration when the light having a wavelength different from that of light having the predetermined wavelength by the prescribed difference of wavelength enters the objective lens optical system not through the coupling optical system.

2. The optical pickup apparatus of claim 1, wherein when light having a wavelength shorter than that of light having said predetermined wavelength enters the objective lens optical system, a focal point thereof is positioned on an under side compared with a focal point of light having said predetermined wavelength, and when light having a wavelength shorter than that of light having said predetermined wavelength enters the coupling lens optical system, a focal point thereof is positioned on an over side compared with the focal point of the light having said predetermined wavelength.

3. The optical pickup apparatus of claim 1, wherein when light having a wavelength shorter than that of light having said predetermined wavelength enters the objective lens optical system, a focal point thereof is positioned on an over side compared with a focal point of light having said predetermined wavelength, and when light having a wavelength shorter than that of light having said predetermined wavelength enters the coupling lens optical system, a focal point thereof is positioned on an under side compared with the focal point of the light having said predetermined wavelength.

4. The optical pickup apparatus of claim 1, wherein the objective lens optical system has no diffracting section on an optical surface thereof.

5. The optical pickup apparatus of claim 1, wherein the objective lens optical system is consisted of a lens whose surfaces are aspherical.

6. The optical pickup apparatus of claim 1, wherein the objective lens optical system is consisted of two lenses each having an aspherical diffracting surface on at least one surface thereof.

7. The optical pickup apparatus of claim 1, wherein a numerical aperture of the objective lens optical system on a side of the optical information recording medium is not less than 0.58.

8. The optical pickup apparatus of claim 7, wherein a numerical aperture of the objective lens optical system on a side of the optical information recording medium is not less than 0.65.

9. The optical pickup apparatus of claim 1, wherein a wavelength of the light source is not more than 700 nm.

10. The optical pickup apparatus of claim 9, wherein a wavelength of the light source is not more than 600 nm.

11. The optical pickup apparatus of claim 1, wherein the coupling optical system is a collimator optical system for converting the light flux emitted from the light source into a light flux which is in substantially parallel to an optical axis of the coupling optical system.

12. The optical pickup apparatus of claim 1, wherein the coupling optical system makes a divergent angle of the light flux emitted from the light source to be smaller.

13. The optical pickup apparatus of claim 1, wherein the coupling optical system converts the light flux emitted from the light source into a converged light flux.

14. The optical pickup apparatus of claim 1, wherein the diffraction surface has a diffraction pattern which is sub stantially in a shape of concentric circles, and a minimum pitch $\Lambda min$ of the diffraction pattern satisfies the following condition, $$2\lambda < \Lambda min < 100\ \lambda$$

where $\lambda$ represents a wavelength of the light flux emitted from the light source.

15. The optical pickup apparatus of claim 14, wherein a wavelength of the light source is not more than 450 nm, the diffraction surface has a diffraction pattern which is substantially in a shape of concentric circles, and a minimum pitch $\Lambda min$ of the diffraction pattern satisfies the following condition, $$2\lambda < \Lambda min < 30\ \lambda.$$

16. The optical pickup apparatus of claim 1, wherein the diffraction surface has a diffraction pattern which is substantially in a shape of concentric circles, and a minimum pitch $\Lambda min$ of the diffraction pattern satisfies the following condition, $$0.4\ \mu m < \Lambda min < 13.5\ \mu m.$$

17. The optical pickup apparatus of claim 1, wherein the coupling optical system has a focal length of not less than 2 mm and not more than 25 mm for a light whose wavelength is 400 nm.

18. The optical pickup apparatus of claim 1, wherein the coupling optical system has a plastic lens.

19. A coupling lens for use in an optical pickup apparatus, comprising:

a diffraction surface, wherein when light having a wavelength that is shorter than that of light having a predetermined wavelength enters the coupling lens, a focal point thereof is positioned on an over side compared with a focal point of light having said predetermined wavelength.

20. An optical information recording medium recording or reproducing apparatus for recording information to an optical information recording medium or for reproducing information from the optical information recording medium, the optical information recording medium recording or reproducing apparatus comprising:

the optical pickup apparatus having:
(a) a light source for emitting light flux;
(b) a light-converging optical system for converging the light flux emitted from the light source, the light-converging optical system having,
(1) a coupling optical system for converting a divergent angle of the light flux emitted from the light source, and (2) an objective lens optical system for converging light flux emitted from the coupling optical system onto an information recording surface of the optical information recording medium; and (c) an light detector for detecting a light reflected from or transmitted through the information recording surface of the optical information recording medium, wherein at least one surface of the coupling optical system is provided with a diffraction surface by which a longitudinal spherical aberration is made to be smaller when light having a wavelength different from that of light having a predetermined wavelength by a prescribed difference of wavelength enters the objective lens optical system through the coupling optical system, compared with a longitudinal spherical aberration when the light having a wavelength different from that of the light having the predetermined wavelength by the prescribed difference of wavelength enters the objective lens optical system not through the coupling optical system.

* * * * *

UNITED STATES PATENT AND TRADEMARK OFFICE
CERTIFICATE OF CORRECTION

PATENT NO.    : 6,411,587 B1
DATED         : June 25, 2002
INVENTOR(S)   : Norikazu Arai et al.

It is certified that error appears in the above-identified patent and that said Letters Patent is hereby corrected as shown below:

<u>Column 47, line 67 through Column 48, line 1,</u>
"sub stantially" should read -- substantially --.

Signed and Sealed this

Thirty-first Day of December, 2002

JAMES E. ROGAN
*Director of the United States Patent and Trademark Office*